US006625609B1

(12) United States Patent
McDade et al.

(10) Patent No.: US 6,625,609 B1
(45) Date of Patent: Sep. 23, 2003

(54) METHOD AND SYSTEM FOR NAVIGATING WITHIN A BODY OF DATA USING ONE OF A NUMBER OF ALTERNATIVE BROWSE GRAPHS

(75) Inventors: Robert W. McDade, Bellevue, WA (US); Anne K. Krook, Seattle, WA (US); Bonnie Bouman, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/433,799

(22) Filed: Nov. 3, 1999

(51) Int. Cl.[7] ................................................ G06F 17/30
(52) U.S. Cl. ............................ 707/102; 707/10; 707/9
(58) Field of Search .............................. 707/102, 100, 707/10, 9, 104.1, 513

(56) References Cited

U.S. PATENT DOCUMENTS

| | | | | |
|---|---|---|---|---|
| 5,721,908 A | * | 2/1998 | Lagarde et al. | 707/10 |
| 5,812,134 A | * | 9/1998 | Pooser et al. | 345/848 |
| 5,907,843 A | * | 5/1999 | Cleron et al. | 707/10 |
| 6,081,814 A | * | 6/2000 | Mangat et al. | 707/501 |
| 6,211,877 B1 | * | 4/2001 | Steele et al. | 345/804 |
| 6,324,552 B1 | * | 11/2001 | Chang et al. | 707/501 |
| 6,363,383 B1 | * | 3/2002 | Kindo et al. | 707/9 |

* cited by examiner

*Primary Examiner*—Greta Robinson
(74) *Attorney, Agent, or Firm*—Perkins Coie LLP

(57) ABSTRACT

A facility for navigating within a body of data using one of a number of distinct browse graphs is described. Initially, a navigation request is received. Based upon information contained in the received navigation request, the facility selects one of the plurality of browse graphs. In response to user input the facility browses the body of data using the selected browse graph.

32 Claims, 19 Drawing Sheets

Fig. 10 relation table (1000)

| graph identifier (1001) | relation identifier (1002) | relation name (1003) | parent node identifier (1004) | child node identifier (1005) |
|---|---|---|---|---|
| 1 | 5 | Coins & Stamps | 1 | 15 | (1011)
| 1 | 6 | Collectibles | 1 | 36 | (1012)
| 1 | 7 | Comics, Cards, Sci-Fi | 1 | 99 | (1013)
| 1 | 8 | Computers & Software | 1 | 27 | (1014)
| 1 | 9 | Electronics & Photography | 1 | 14 | (1015)
| 1 | 14 | Collectibles | 15 | 92 | (1016)
| 1 | 23 | Coins & Stamps | 36 | 92 | (1017)
| 1 | 94 | Paper | 36 | 111 | (1018)
| 1 | 95 | Pez | 36 | 76 | (1019)
| 1 | 96 | Pinbacks | 36 | 55 | (1020)
| 1 | 211 | Consumer Electronics | 14 | 42 | (1021)
| 1 | 214 | Mobile Phones | 42 | 43 | (1022)
| 1 | 215 | Phones | 43 | 44 | (1023)

relation table

| graph identifier | relation identifier | relation name | parent node identifier | child node identifier | |
|---|---|---|---|---|---|
| 1 | 5 | Coins & Stamps | 1 | 15 | 1111 |
| 1 | 6 | Collectibles | 1 | 36 | 1112 |
| 1 | 7 | Comics, Cards, Sci-Fi | 1 | 99 | 1113 |
| 1 | 8 | Computers & Software | 1 | 27 | 1114 |
| 1 | 9 | Electronics & Photography | 1 | 14 | 1115 |
| 1 | 14 | Collectibles | 15 | 92 | 1116 |
| 1 | 23 | Coins & Stamps | 36 | 92 | 1117 |
| 1 | 94 | Paper | 36 | 111 | 1118 |
| 1 | 95 | Pez | 36 | 76 | 1119 |
| 1 | 96 | Pinbacks | 36 | 55 | 1120 |
| 1 | 211 | Consumer Electronics | 14 | 42 | 1121 |
| 1 | 214 | Mobile Phones | 42 | 43 | 1122 |
| 1 | 215 | Phones | 43 | 44 | 1123 |
| 2 | 5 | Coins & Stamps | 1 | 15 | 1124 |
| 2 | 6 | Collectibles | 1 | 36 | 1125 |
| 2 | 7 | Comics, Cards, Sci-Fi | 1 | 99 | 1126 |
| 2 | 8 | Computers & Software | 1 | 27 | 1127 |
| 2 | 9 | Electronics & Photography | 1 | 14 | 1128 |
| 2 | 14 | Collectibles | 15 | 92 | 1129 |
| 2 | 23 | Coins & Stamps | 36 | 92 | 1130 |
| 2 | 94 | Paper | 36 | 111 | 1131 |
| 2 | 96 | Pinbacks | 36 | 55 | 1132 |
| 2 | 211 | Consumer Electronics | 14 | 42 | 1133 |
| 2 | 214 | Mobile Phones | 42 | 43 | 1134 |
| 2 | 215 | Phones | 43 | 44 | 1135 |
| 2 | 693 | Handies | 1 | 44 | 1136 |

*Fig. 11*

METHOD AND SYSTEM FOR NAVIGATING WITHIN A BODY OF DATA USING ONE OF A NUMBER OF ALTERNATIVE BROWSE GRAPHS

TECHNICAL FIELD

The present invention is directed to the field of data browsing, and, more particularly, to the field of customizable data browsing.

BACKGROUND

As computer use, and particularly the use of the World Wide Web, becomes more and more prevalent, the volumes of data that are available for access using a computer system grow larger and larger. In order for a user to be able to find and make use of particular data, the body of data in which the particular data is contained must be effectively organized.

One way in which a body of data can be organized is by providing a browse graph onto the body of data. A browse graph is a structure, or a "map," for navigating the information contained in the body of data. A browse graph is made up of nodes between which the user may move to access different portions of the information in the body of data. The user begins at a first node, called a "root node." At the root node, the user may choose from a number of different categories. By selecting one of these categories, the user moves to a different node, where the user may view a portion of the information in the body of data pertaining to the selected category and/or select from among a new set of categories to move to another node in the graph. In this manner, the user may move from node to node, viewing the information corresponding to each node.

As an example, an online merchant may provide a browse graph onto information on a large number of items that it is offering for sale. In order to find information on Pez candy dispensers for sale using such a browse graph, a user begins at the root node of the browse graph, and there chooses "COLLECTIBLES" from among a list of high-level categories including "ARTS & ANTIQUES," "BOOKS," "CLOTHING & ACCESSORIES," "COINS & STAMPS," and "COLLECTIBLES," among others. By choosing the "COLLECTIBLES" category, the user moves to a lower-level node in the graph. There, the user chooses "PEZ" from among a list of lower-level categories that are all subcategories of "COLLECTIBLES," including "AUTOGRAPHS," "BOTTLES & CANS," "LUNCHBOXES," and "PEZ," among others. By choosing the "PEZ" category, the user moves to a yet-lower-level node in the graph, where the user can view information on Pez candy dispensers offered for sale by the online merchant.

Such browse graphs, while generally useful, can be disadvantageous when they are poorly adapted to a particular user. For example, where a browse graph locates information that a user is particularly interested in at a level "deep" in the browse graph, thereby requiring a large number of selections to reach the information, that browse graph becomes cumbersome for that user to use. On the other hand, where a browse graph provides access to information that a user does not wish to see or is prohibited from seeing, that browse graph is over-inclusive with respect to that user.

Accordingly, a facility for providing browse graphs that are customized to their users would have significant utility.

BRIEF DESCRIPTION OF THE DRAWINGS

FIG. 10 is a data structure diagram showing a sample relation table representing a single browse graph.

FIG. 11 is a data structure diagram showing a sample relation table representing two alternative browse graphs, including the browse graph represented by the relation table shown in FIG. 10 and an alternative browse graph derived from the browse graph represented by the relation table shown in FIG. 10.

DETAILED DESCRIPTION

The present invention is directed to data navigation using one of a number of alternative browsing graphs. In a preferred embodiment, a browsing facility ("the facility") maintains two or more different browsing graphs on the same set of browse data. Based upon information associated with a user seeking to browse the browse data, or based upon the nature of a request issued by the user, the facility selects one of the browsing graphs, which is used by the user to browse the browse data. By providing different browse graphs on the same browse data, the facility enables a user to utilize a browse graph that is tailored to the user. For example, for a user that has a special interest in a particular kind of data, the user may utilize a browse graph that features that data more prominently, allowing the user to reach the data much more efficiently. As another example, for users that are prohibited from seeing or wish not to see particular data, a browse graph may be provided that does not provide access to such information. By providing multiple browse graphs onto the same browse data in this manner, the facility is able to make the browse data more usable to users with different browsing preferences.

Figure 1:
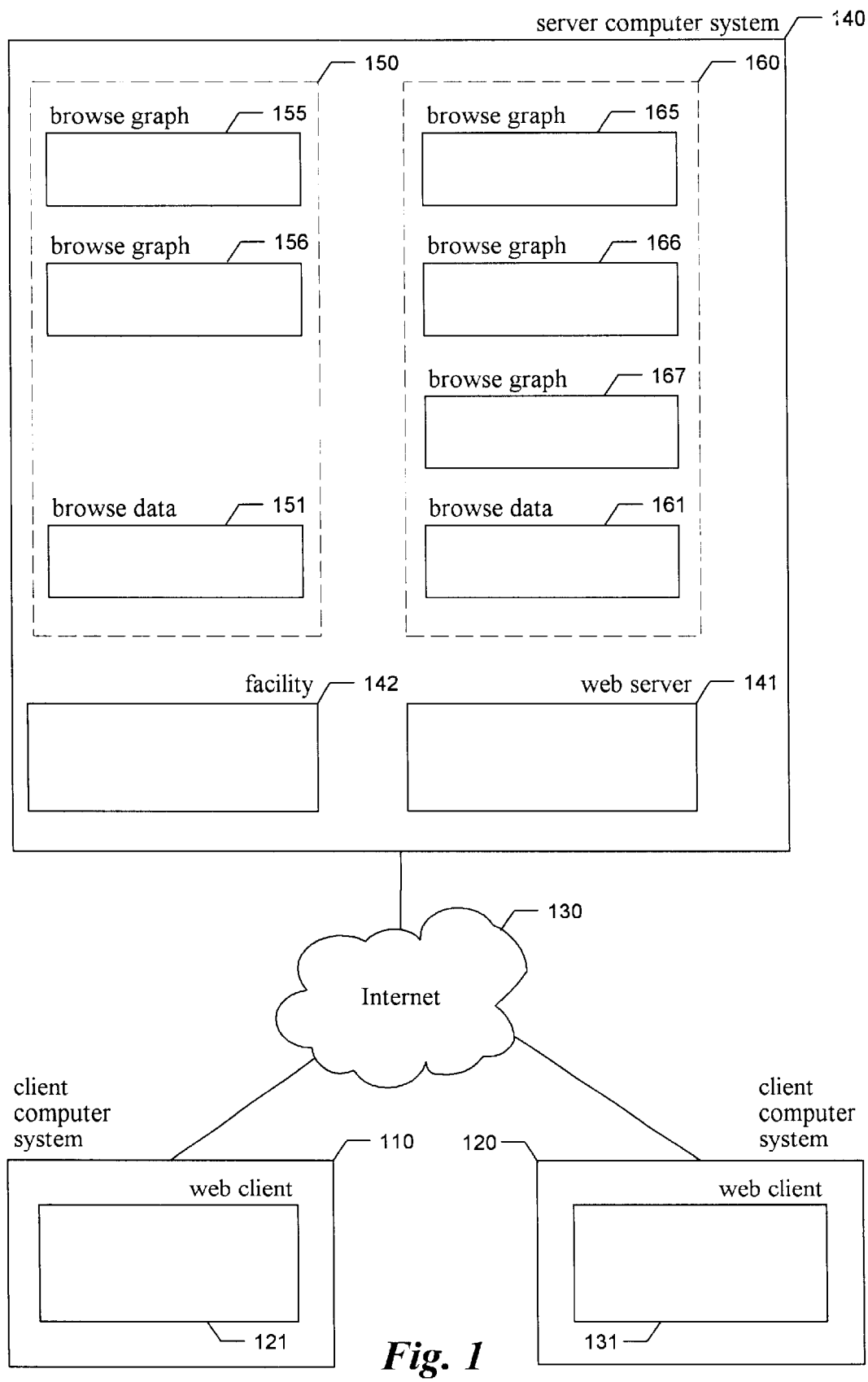
FIG. 1 is a high-level block diagram showing the environment in which the facility preferably operates.

FIG. 1 is a high-level block diagram showing the environment in which the facility preferably operates. The block diagram shows client computer systems, such as client computer systems 110 and 120, that are connected via the Internet 130 to a server computer system 140. Those skilled in the art will recognize that client computer systems could be connected to the server computer system by networks other than the Internet, however. The client computer systems preferably have a web client computer program, such as web clients 121 and 131, that are used by users to connect to a web server computer program 141 in the server computer system.

The web server, together with the facility 142, enables the user of a web client to browse a body of browse data, such as browse data 151 and browse data 161. Such browsing uses one of a plurality of browse graphs, also called "browse hierarchies" provided for the browse data. For example, for browse data 161, three browse graphs 165, 166 and 167 are provided. A body of browse data together with the browse graphs provided for are together known as a "browse group." For example, browse data 161 and browse graphs 165, 166, and 167 together comprise browse group 160. The facility 142 executing on the server computer system preferably identifies one of the browse graphs provided for a body of browse data as described further below. In an alternate embodiment, each of the browse graphs in a particular browse group is distributed to a different server computer system, such that the browse graph used by the user is determined by the identity of the server computer system to which the user connects. In this embodiment, the browse data may either be maintained in a central server computer system, or replicated to some or all of the multiple server computer systems.

While preferred embodiments are described in terms of the environment described above, those skilled in the art will appreciate that the facility may be implemented in a variety of other environments, including a single, monolithic computer system, as well as various other combinations of computer systems or similar devices.

To more fully illustrate its implementation and operation, the facility is described in conjunction with an example in which the body of data is comprised of information describing a large number of items that are for sale, such as items available for sale via online auction. Those skilled in the art will recognize, however, that the facility may be employed to navigate bodies of data of all sorts. In the example, the user wishes to display information about Pez candy dispenser items and mobile phone items that are for sale.

Figure 2A:
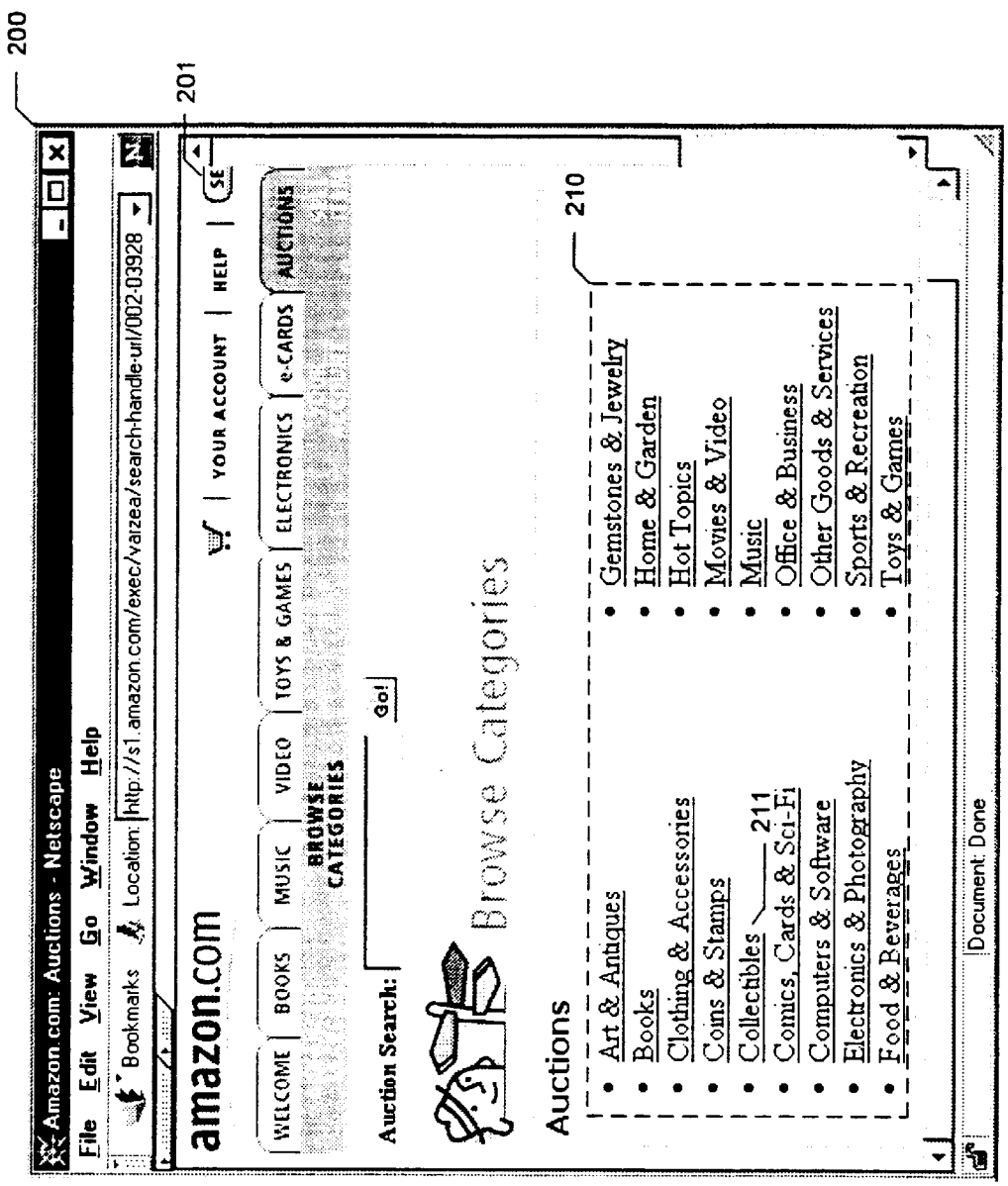
FIGS. 2A–2C are display diagrams showing a user browsing to a "PEZ" category using a first browse graph.
Figure 2B:
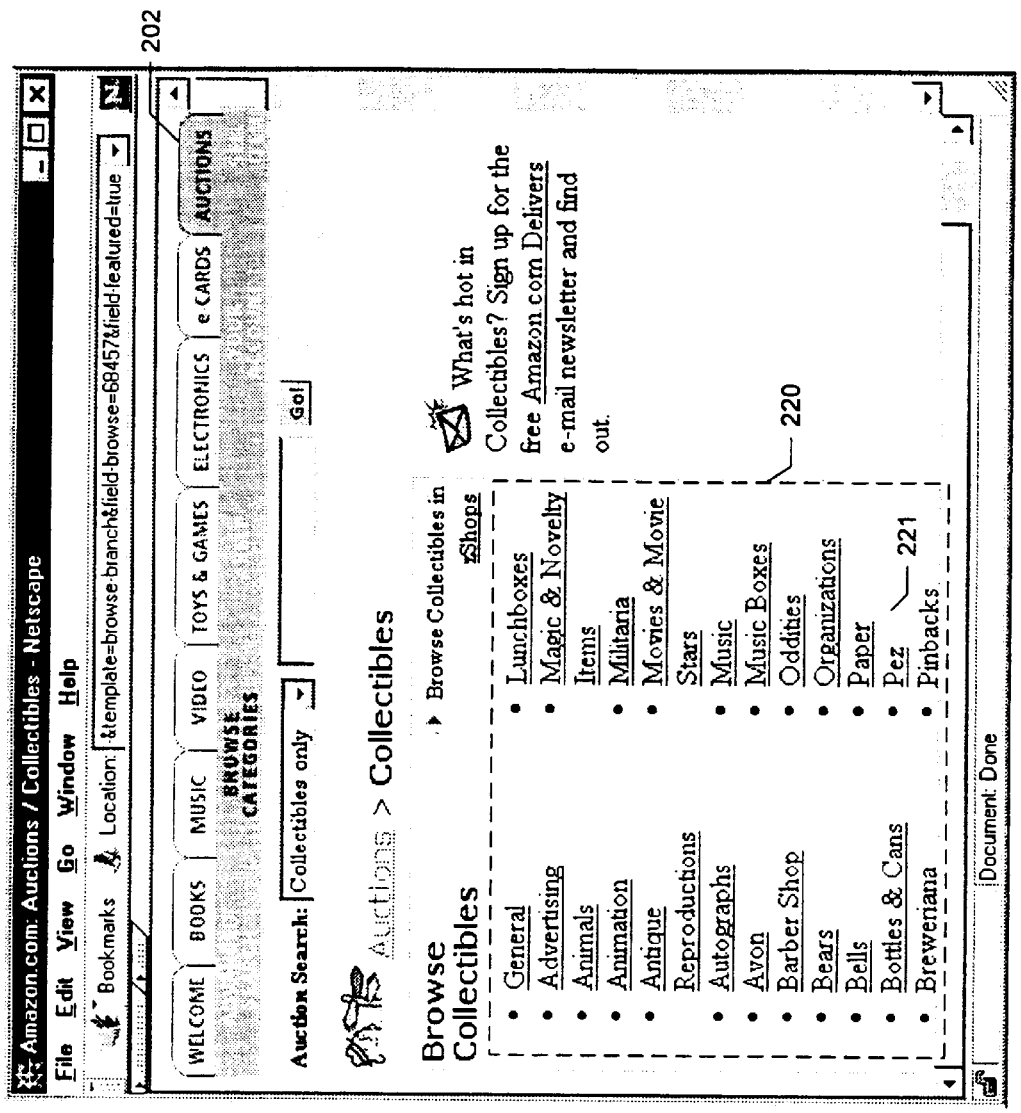
Figure 2C:
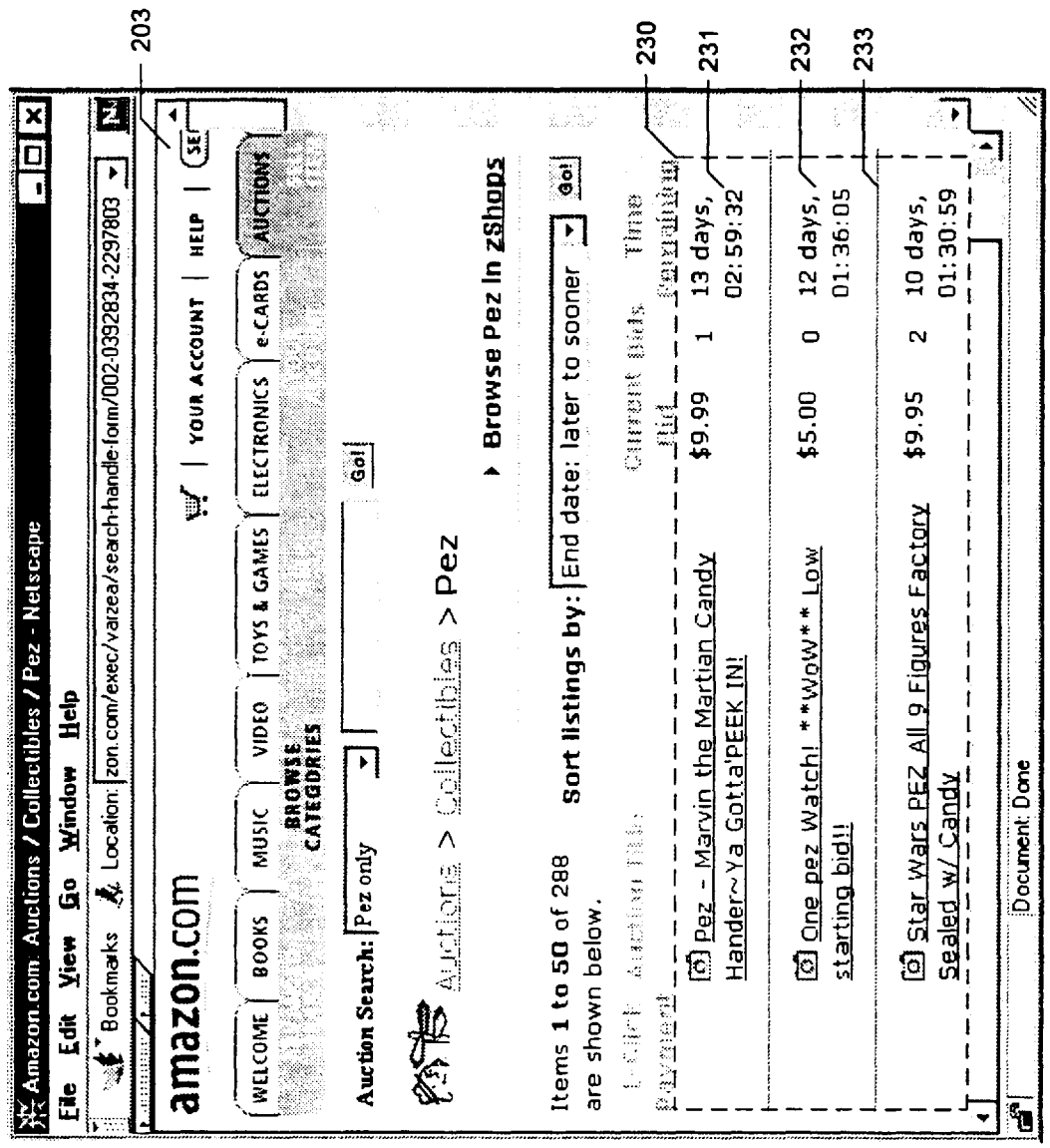

FIGS. 2A–2C are display diagrams showing a user browsing to a "PEZ" category containing such information using a first browse graph in which such information is accessible. FIG. 2A shows the display of a web page ("page") 201 containing the initial categories occurring at the root node of the first browse graph. In particular, the categories 210 include "COLLECTIBLES" category 111.

When the user selects "COLLECTIBLES" category 111, the facility displays page 202 shown in FIG. 2B. Page 202 contains a new set of categories 220, each relating to a different type of collectible items. The categories 220 include a "PEZ" category 221 for Pez candy dispensers.

When the user selects category 221 for Pez candy dispensers, the facility displays page 203 shown in FIG. 2C. Page 203 contains information 230 about Pez candy dispensers that are for sale. For example, information item 231 shows information about a Pez candy dispenser in the shape of the Marvin the Martian character that is being sold via online auction. Thus, it can be seen that, using the first browse graph, a user is able to access information about Pez candy dispensers.

In this respect, the first browse graph is contrasted with a second browse graph, which prevents access to information about Pez candy dispensers that are for sale. Such prevention may be desirable where the user is uninterested in or offended by such candy dispensers, or where the user resides in a jurisdiction where the sale or purchase of such candy dispensers is illegal.

Figure 3A:
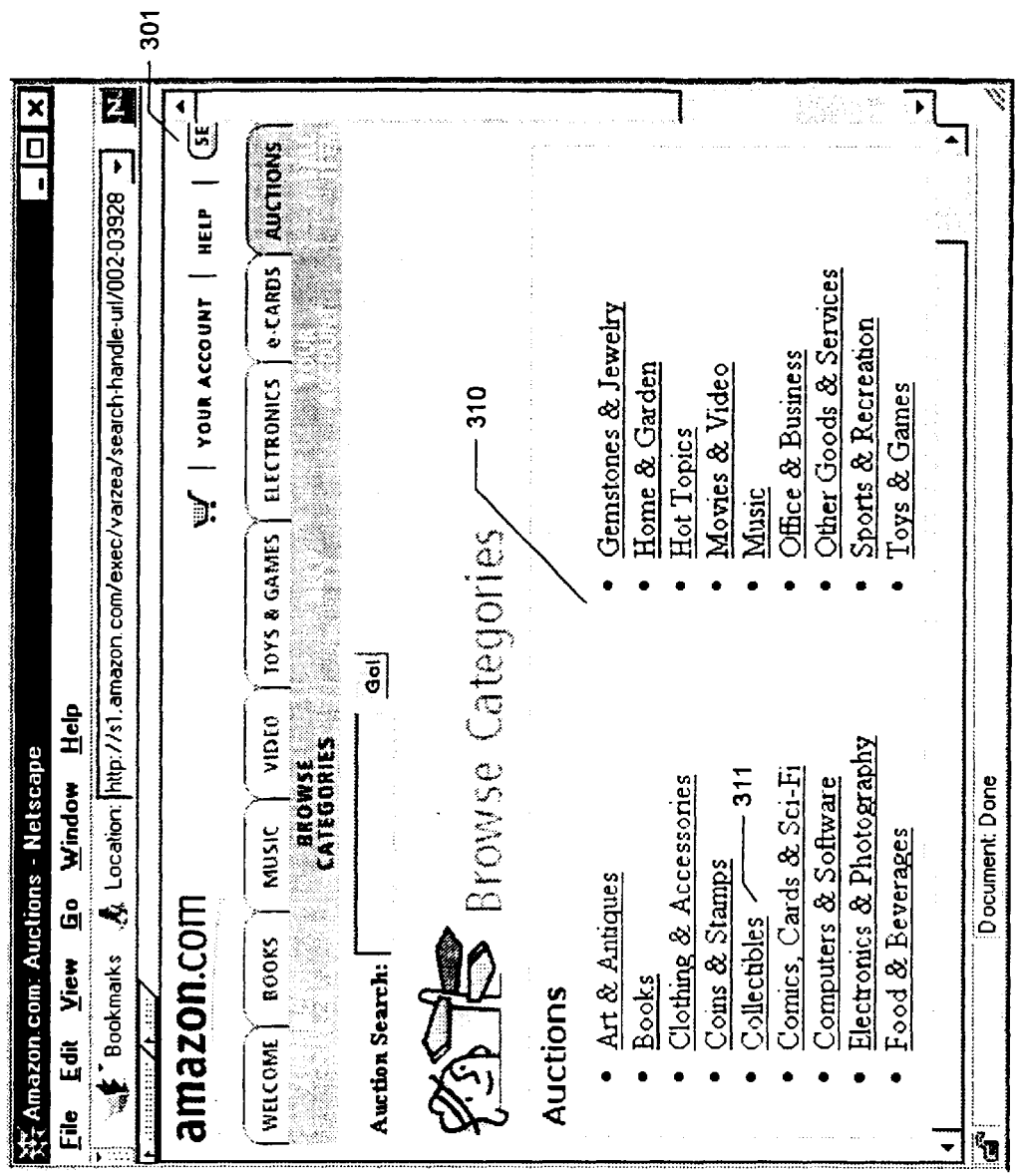
FIGS. 3A–3B are display diagrams showing that a user is unable to browse to the "PEZ" category using a second browse graph.
Figure 3B:
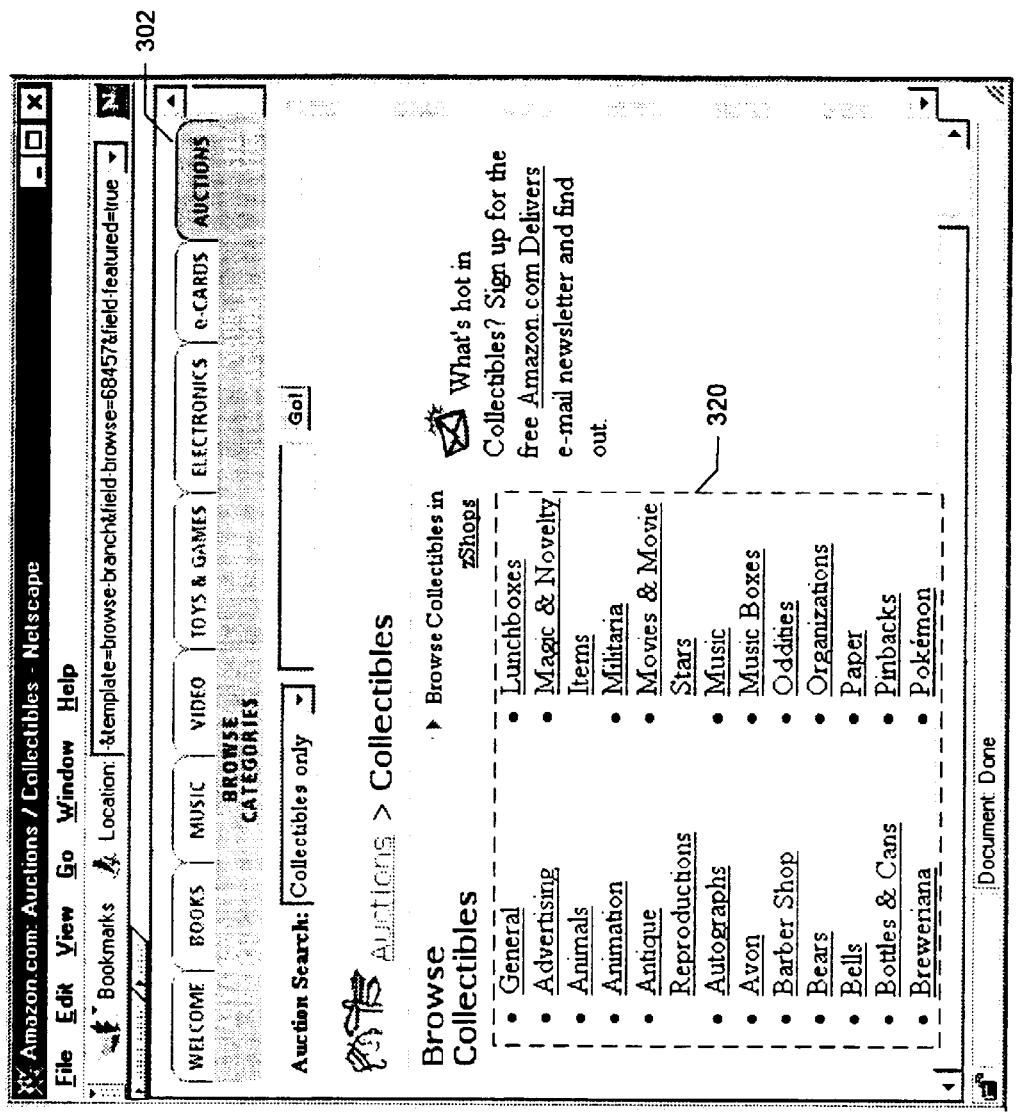

FIGS. 3A–3B are display diagrams showing that a user is unable to browse to the "PEZ" category using a second browse graph. FIG. 3A shows the display of page 301, in which is displayed a list 310 of the categories available from the root node of the second browse graph. The displayed categories 310 includes a "COLLECTIBLES" category 311.

When the user selects the "COLLECTIBLES" category 311, page 302 shown in FIG. 3B is displayed. Page 302 contains a list 320 available at the collectibles node of the second browse graph. Categories 320 shown in FIG. 3B differ from categories 210 in that they omit the "PEZ" category included in the first browse graph. Because this category is not available at the collectibles node of the second browse graph, users using the second browse graph to browse the body of information about items offered for sale are prevented from accessing information about Pez candy dispensers that are for sale.

A second aspect of the example shows how a browse graph may be adapted to locate information about a topic of interest to its users in close proximity to the root node, thereby shortening the path of interactions that users must perform in order to browse to such information. In the example, a path requiring four interactions in the first browse graph is reduced to a path requiring only one interaction in the second browse graph.

Figure 4A:
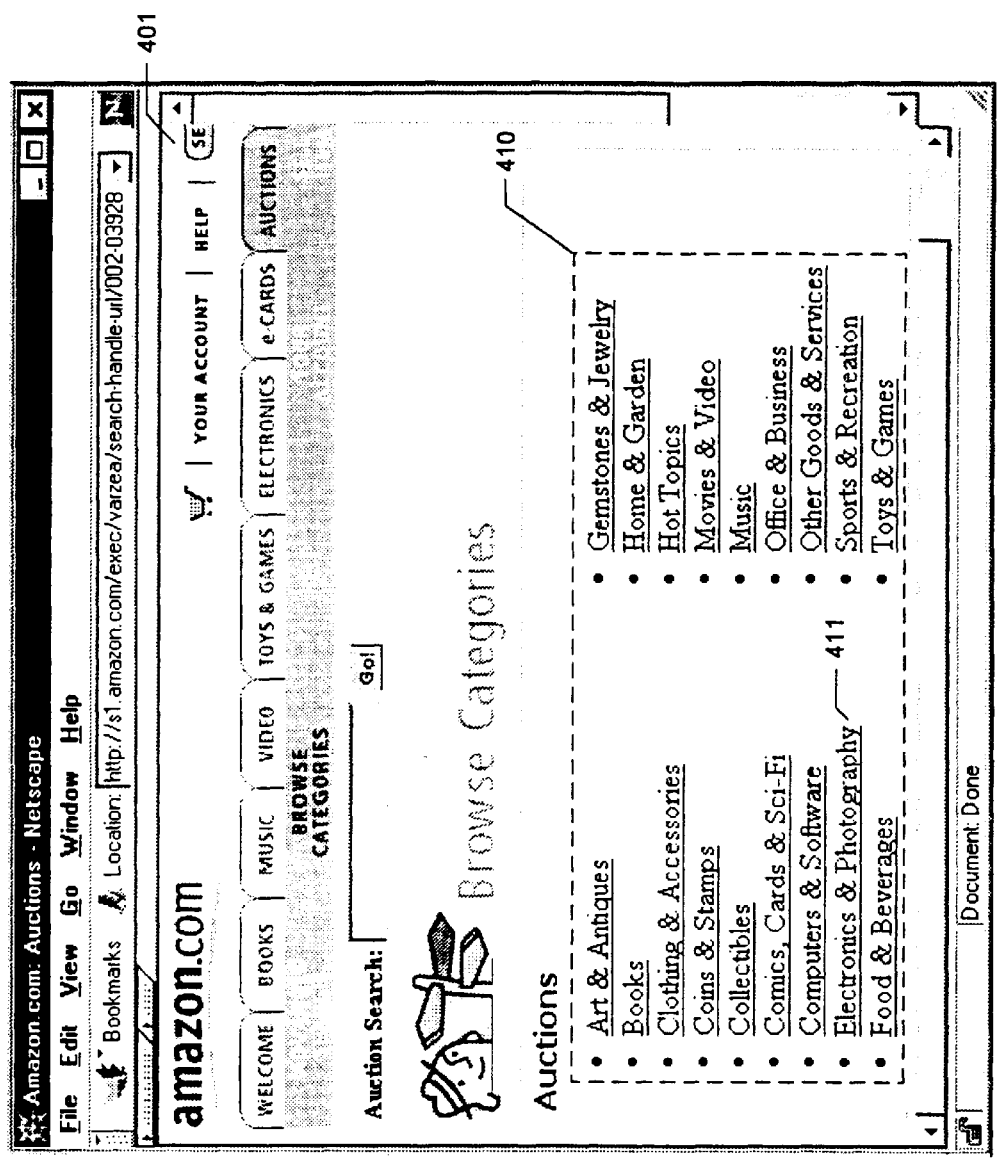
FIGS. 4A–4E are display diagrams showing a user browsing to a "PHONES" category using the first browse graph.

FIGS. 4A–4E are display diagrams showing a user browsing to a "PHONES" category using the first browse graph. FIG. 4A shows the display of page 401, which contains the categories 410 at the root node of the first browse graph. The categories 410 include an "ELECTRONICS & PHOTOGRAPHY" category 411.

Figure 4B:
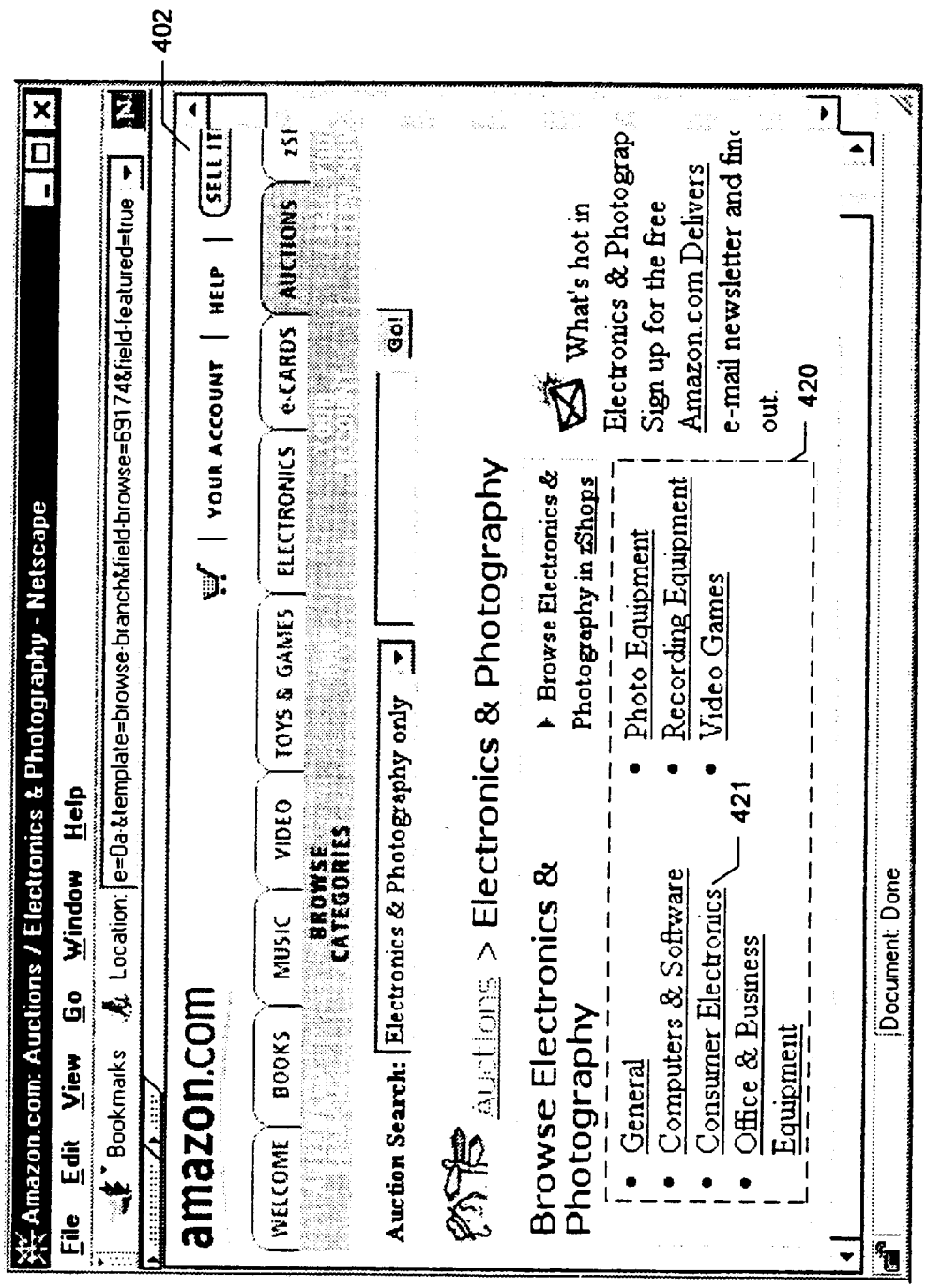

When the user selects the "ELECTRONICS & PHOTOGRAPHY" in category 411, the facility displays page 402 shown in FIG. 4B. Page 402 includes categories 420 each corresponding to a subcategory of "ELECTRONICS & PHOTOGRAPHY." The categories 420 include a "CONSUMER ELECTRONICS," category 421.

Figure 4C:
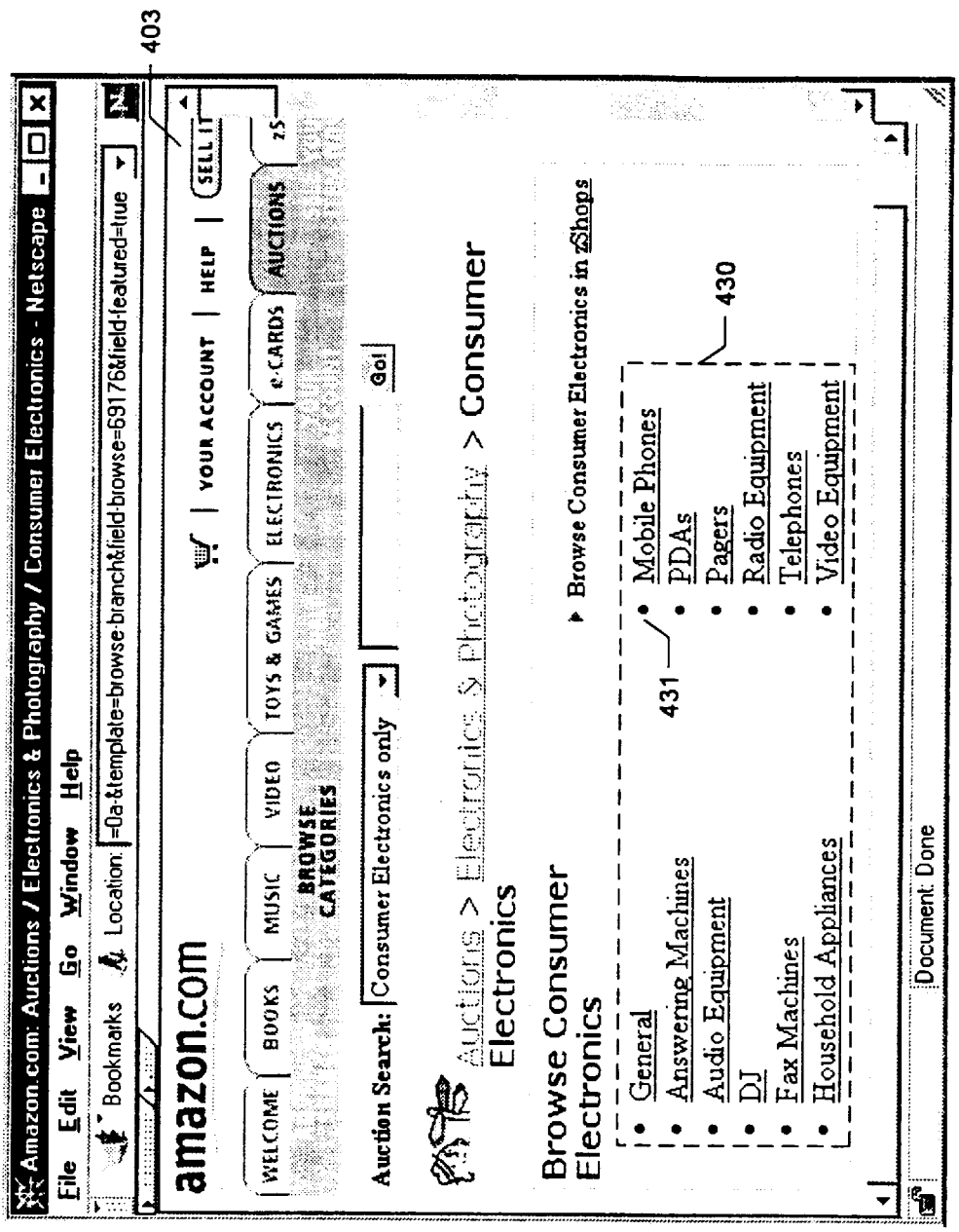

When the user selects the "CONSUMER ELECTRONICS" category 421, the facility displays page 403 shown in FIG. 4C. Page 403 includes categories 430 each corresponding to a subcategory of "CONSUMER ELECTRONICS." Categories 430 include a "MOBILE PHONES" category 431.

Figure 4D:
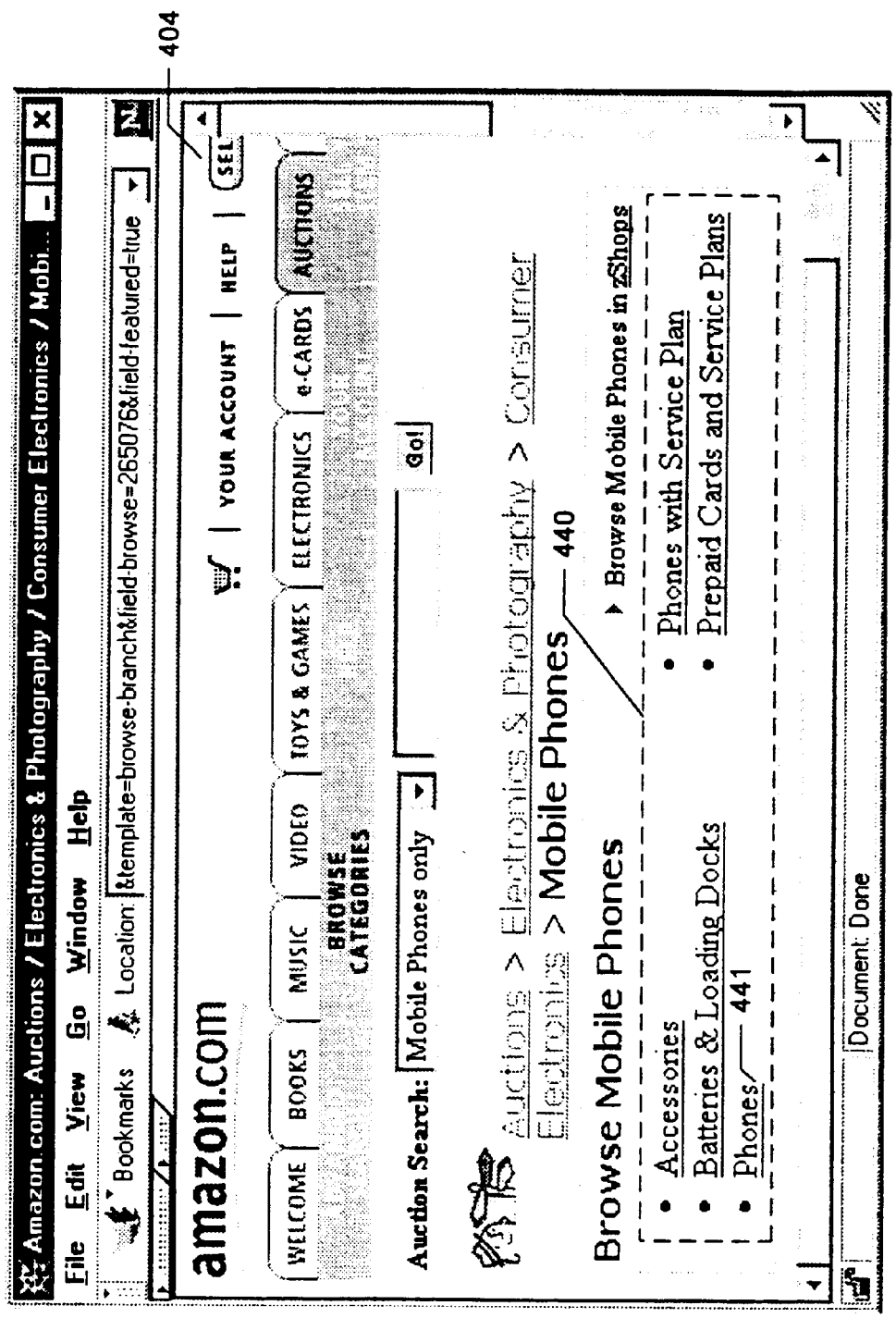
Figure 4E:
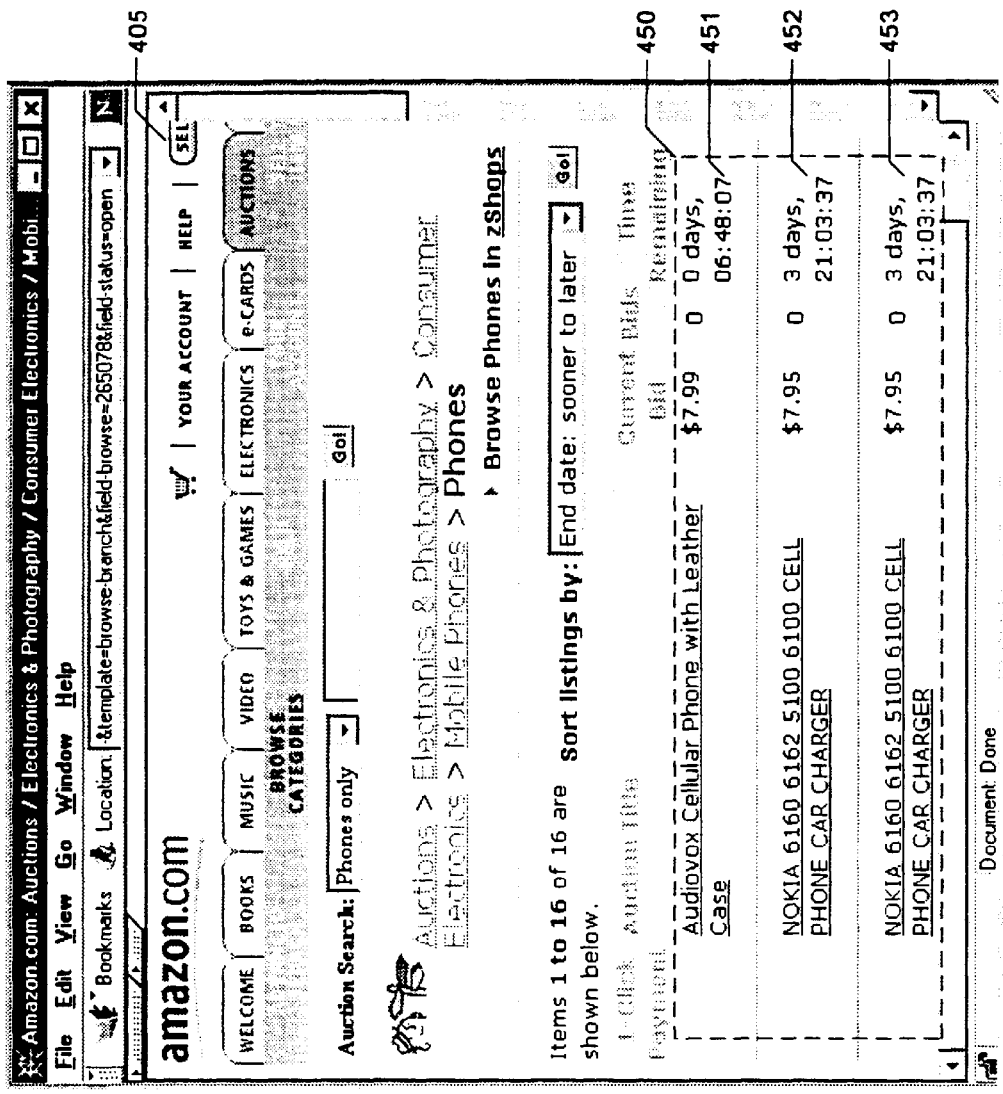

When the user selects the "MOBILE PHONES" category 431, the facility displays page 404 shown in FIG. 4D. Page 404 contains categories 440 relating to mobile phones a "PHONES" category 441. When the user selects the "PHONES" category 441, the facility displays page 405 shown in FIG. 4E. Page 405 contains information 450 about cellular phone items that are for sale. For example, information item 451 contains information about an Audivox cellular phone that is for sale via auction.

It can be seen that traversing the first browse graph to access information about cellular phones is relatively arduous, requiring four different user interactions to reach the information from the root node. The second browse graph, on the other hand, developed for users having an interest in mobile phones, enables a user to browse to the same information in a single interaction.

Figure 5A:
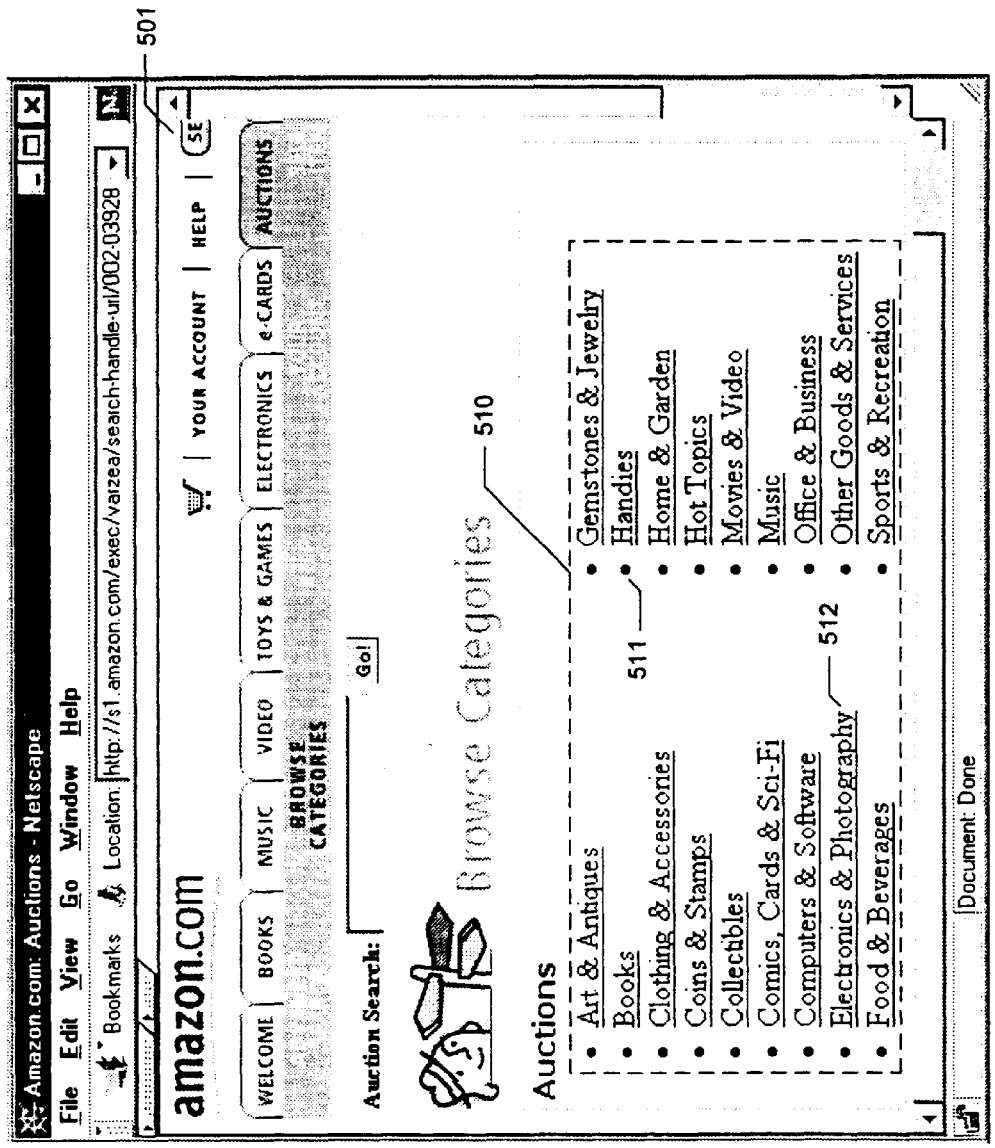
FIGS. 5A–5B are display diagrams showing a user using the second browse graph browse to a "HANDIES" category having the same contents as the "PHONES" graph in the first browse graph.
Figure 5B:
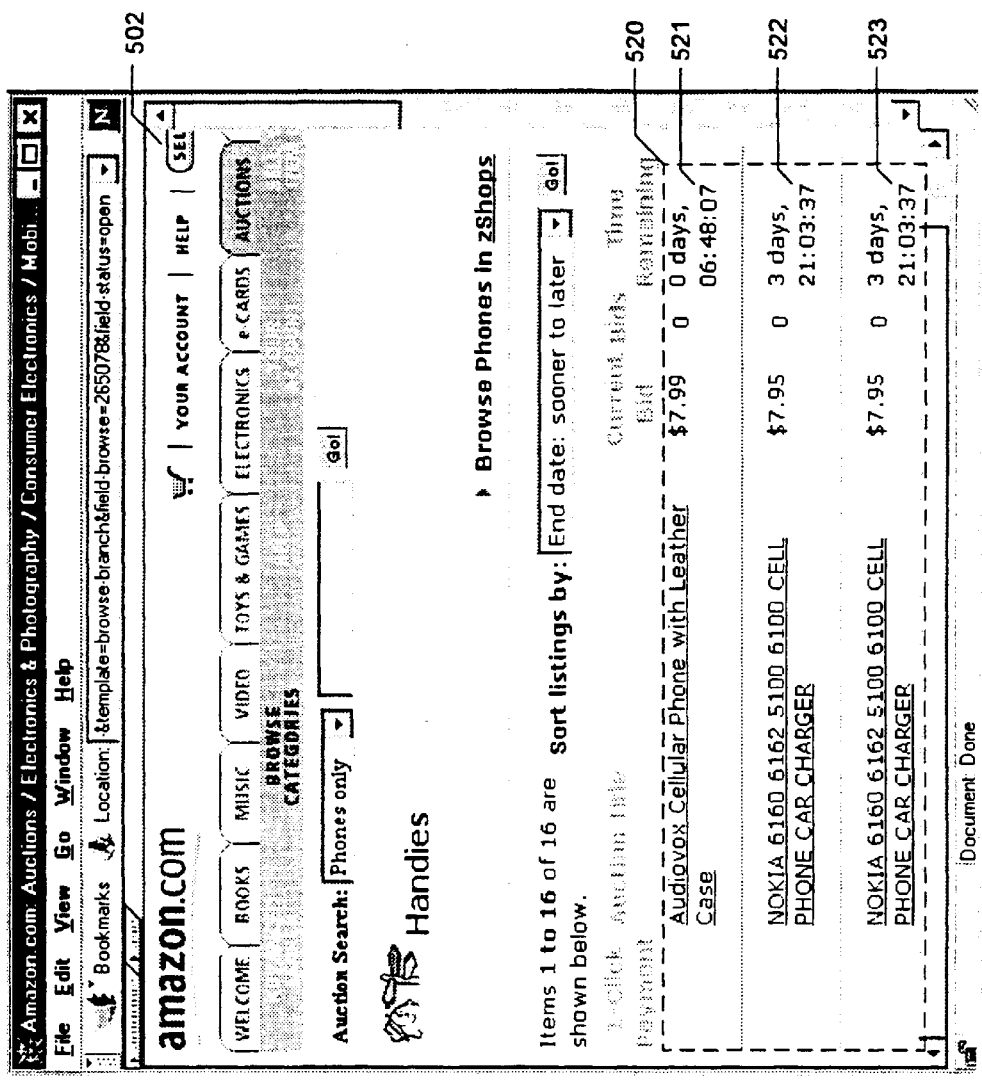

FIGS. 5A–5B are display diagrams showing a user using the second browse graph to browse to a "HANDIES" category having the same contents as the "PHONES" category in the first browse graph. FIG. 5 shows the display of page 501 at the root of the second browse graph. Page 501 includes a list of categories 510 which, in addition to the "ELECTRONICS & PHOTOGRAPHY" category 512, includes a "HANDIES" category 511.

When the user selects the "HANDIES" category 511, the facility immediately displays page 502 shown in FIG. 5B.

Page 502 contains information 520 about mobile phones, or "handies" that are for sale. It can be seen that, when using the second browse graph, this information may be accessed with only a single user interaction by selecting the handies category at the root of the second browse graph.

The facility provides for browse graphs to be created and associated with users in a variety of ways. A browse graph may be associated with a single user, or with a class, or "group" of users. That is, each browse graph may be associated with a particular user's identity, or rather may be associated with groups of users having particular Internet Service Providers, domain name designations, geographic or political regions, or buying patterns. Alternatively, browse graphs, rather than having associations with groups of users, may be dynamically selected by users, either explicitly or implicitly. For explicit selection, the facility preferably displays a list or other indication of the available browse graphs. The user then clicks on or otherwise identifies the browse graph that the user wishes to use to browse the associated body of data. For implicit selection, the selection of a browse graph is performed by the way in which the user selects the body of data to be browsed. For example, if a company operated a first online auction website for the United States and a second online auction website for the United Kingdom, the company could establish a first browse graph on the auction data for the United States online auction website and a second browse graph on the auction data for the United Kingdom on-line auction website. The user would implicitly select between the first and second browse graphs by selecting between the United States and the United Kingdom websites. Still further, a browse graph may be dynamically generated in response to a browse request, based upon such factors as are described above.

Figure 6:
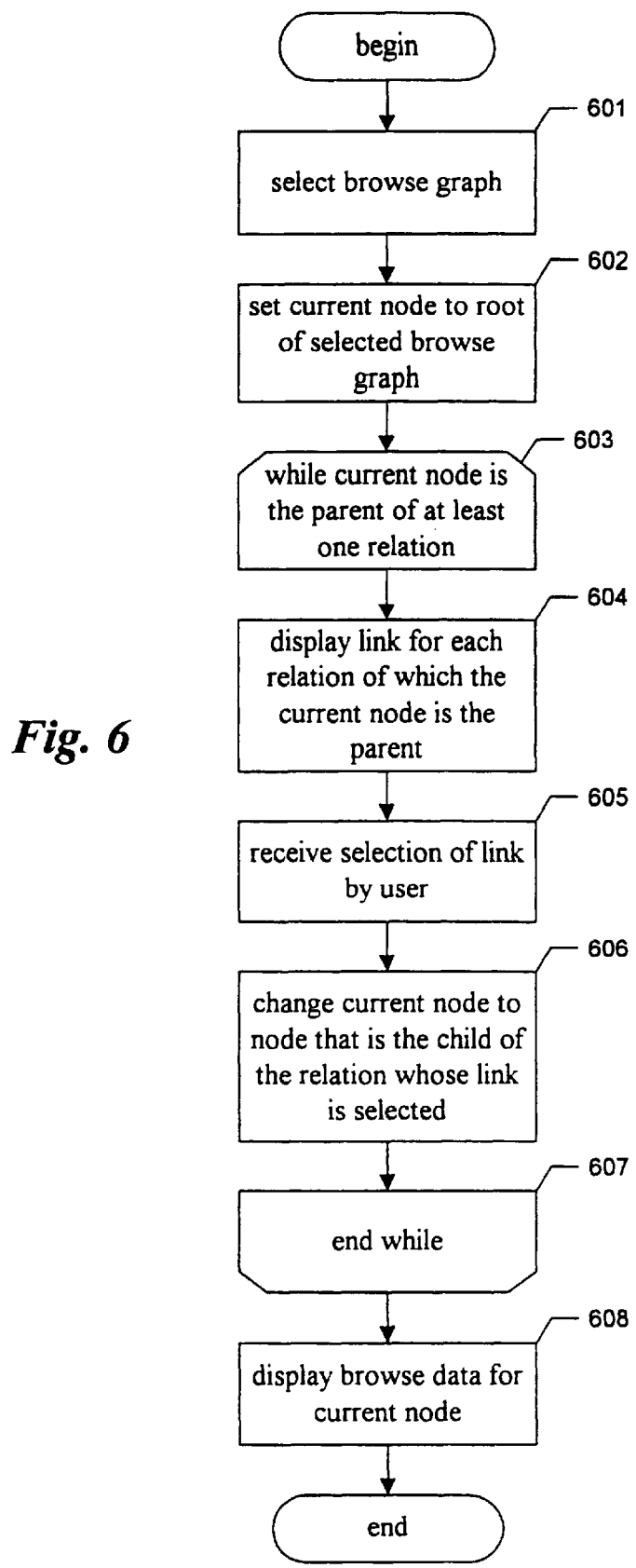
FIG. 6 is a flow diagram showing the steps preferably performed by the facility in order to select and use a particular browse graph for browsing.

FIG. 6 is a flow diagram showing the steps preferably performed by the facility in order to select and use a particular browse graph for browsing. In step 601, the facility selects one of the plurality of browse graphs available for the body of data. Such a selection is preferably performed in one or more of the manners discussed above, or may be performed using additional bases. In step 602, the facility sets the current node of the traversal to the root node of the selected browse graph. The facility then loops through steps 603–607 while the current node is the parent of at least one relation between nodes. In step 604, the facility displays a hyperlink for each relation of which the current node is the parent, such as the hyperlinks of the categories 210 shown in FIG. 2A. In step 605, the facility receives user input selecting one of the hyperlinks displayed in step 604. In step 606, the facility changes the current node in the traversal to the node that is the child of the relation whose hyperlink is selected. In step 607, if the new current node is the parent of at least one relation in the browse graph, then the facility continues in step 604, else the facility continues in step 608. In step 608, the traversal has reached a leaf node of the browse graph that has no children and with which specific browse data is associated, and the facility displays the browse data stored for the current node. After step 608, these steps conclude.

Figure 7:
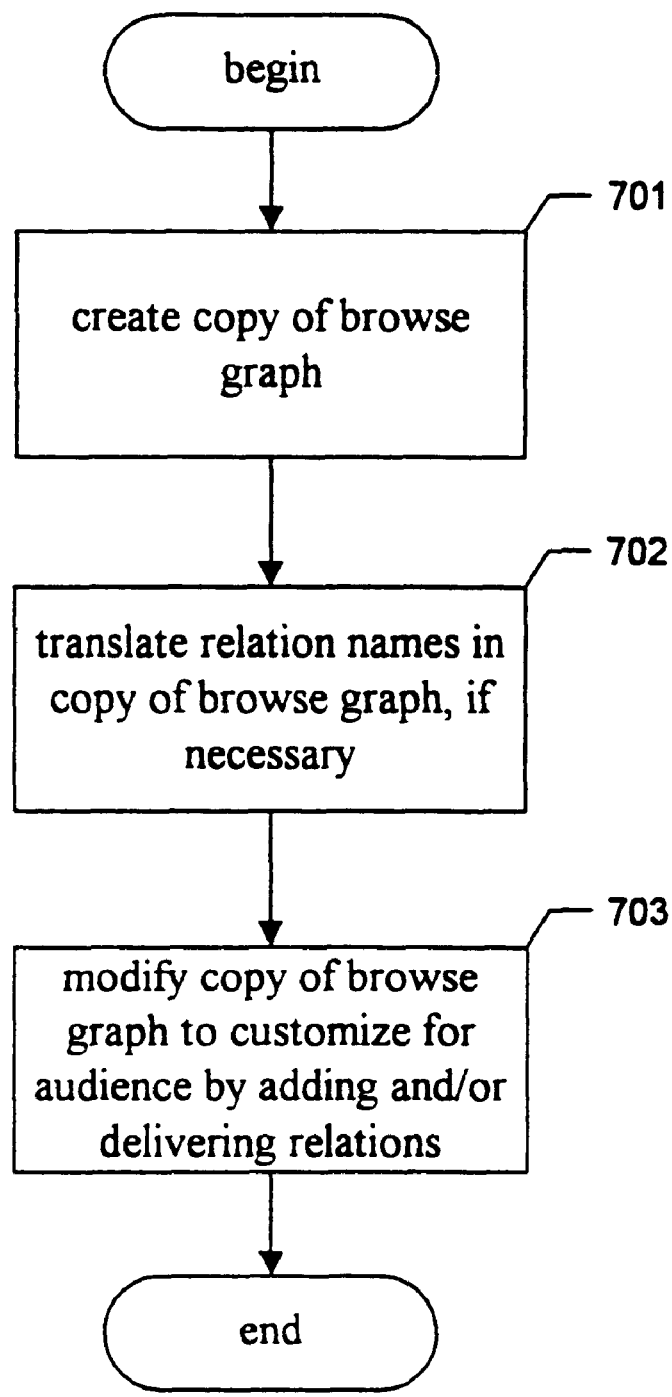
FIG. 7 is a flow diagram showing the steps preferably performed by the facility in order to generate an alternative browse graph.

FIG. 7 is a flow diagram showing the steps preferably performed by the facility in order to generate an alternative browse graph. In step 701, the facility creates a copy of an existing browse graph. In step 702, the facility translates the names of the relations occurring in the copy of the browse graph if the new browse graph is to be in a different natural language. In step 703, the facility modifies the copy of the browse graph to customize the copy of the browse graph for its intended audience. Step 703 variously involves adding and/or deleting relations in the copy of the browse graph. After step 703, these steps conclude and the new browse graph can be made available for use by users.

Figure 8:
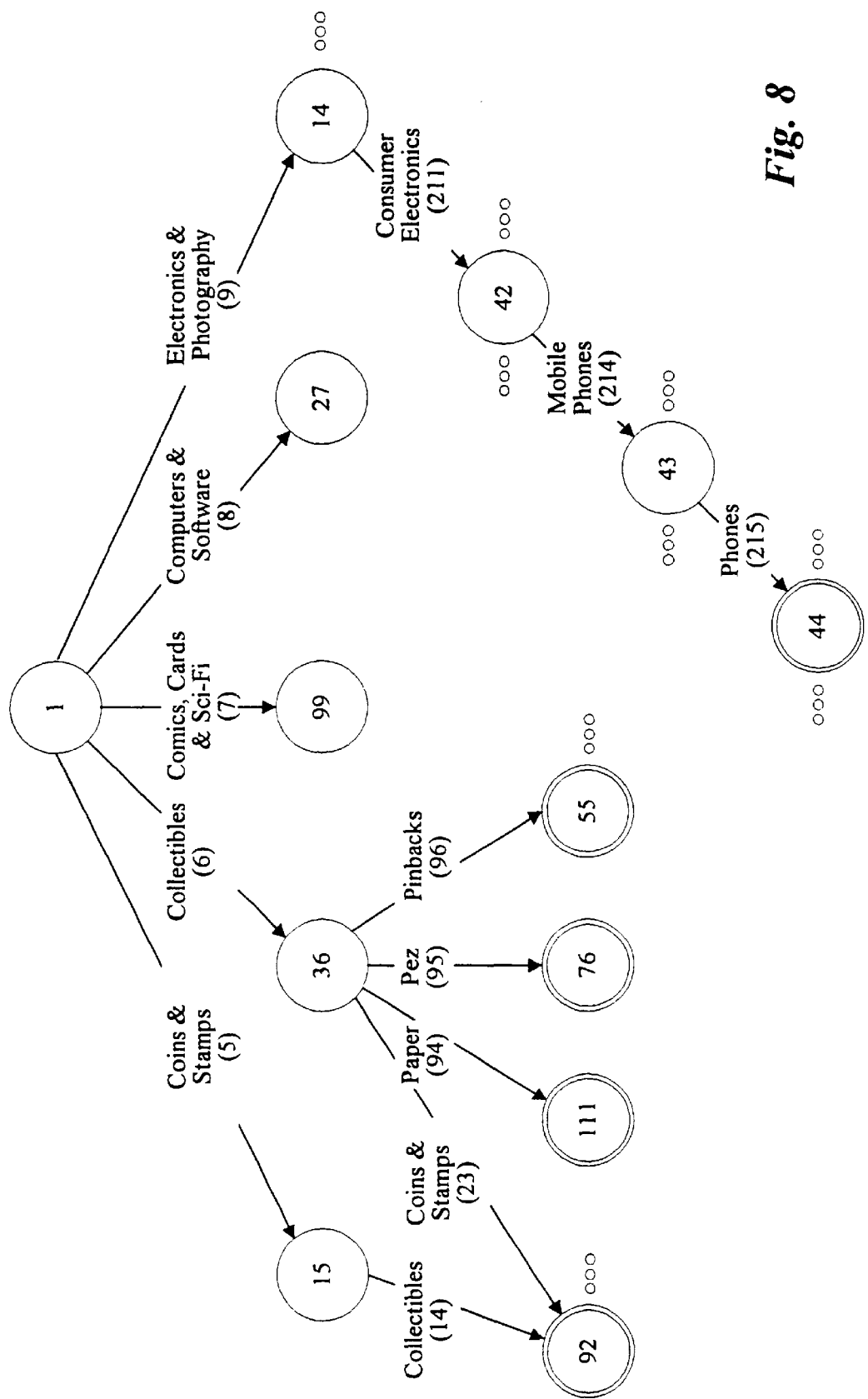
FIG. 8 is a data structure diagram showing a sample browse graph.

FIG. 8 is a data structure diagram showing a sample browse graph. The browse graph is comprised of nodes, shown as circles, connected by directional relations, shown as arrows. Each relation is said to have a parent node, shown at the tail end of its arrow, and a child node, shown at the head end of its arrow. Five relations are shown in FIG. 8 that have the root node, node 1, as their parent node: "COINS & STAMPS" relation 5, "COLLECTIBLES" relation 6, "COMICS, CARDS, & SCI-FI" relation 7, "COMPUTERS & SOFTWARE" relation 8, and "ELECTRONICS & PHOTOGRAPHY" relation 9. Each of these relations corresponds to a category shown when positioned at the root node of the first browse graph. When the user is positioned at root node 1 and selects one of the categories corresponding to one of these relations, the facility traverses the browse graph along that relation from the relation's parent node to its child node. For example, if the category for "COLLECTIBLES" relation 6 is selected by the user while at the root node, the facility traverses the collectible relation 6 to its child node, node 36. At that point, the facility displays the page containing categories corresponding to the relations that have the current node, node 36, as their parent node: "COINS & STAMPS" relation 23, "PAPER" relation 94, "PEZ" relation 95 and "PINBACKS" relation 96. When the user selects one of the categories corresponding to these relations, the facility traverses that relation. For example, if the user selects the category corresponding to the "PEZ" relation 95, then the facility traverses the "PEZ" relation 95 to node 76. Node 76 is characterized as a "leaf node," as there are no relations having node 76 as their parent node. For ease of reference, leaf nodes are identified by a double circle. When the facility traverses to node 76, it identifies node 76 as a leaf node, and displays the browse information associated with it—in this case, the Pez candy dispenser items for sale information shown in FIG. 2C.

In general, the number of relations that must be traversed from the root node in order to reach a particular node is referred to as the depth of that node in the graph. It should be noted that, in some browse graphs, it is possible to reach a particular node by two or more different paths of relations. For example, leaf node 92 may be reached either through the path containing "COINS & STAMPS" relation 5 and "COLLECTIBLES" relation 14, or by the path containing "COLLECTIBLES" relation 6 and "COINS & STAMPS" relation 23. Such "alternative paths" to the same node from the root node may contain different numbers of relations. It should further be noted that, for clarity, some nodes and relations—identified by ellipses—have been omitted from the browse graph shown in FIG. 8.

Figure 9:
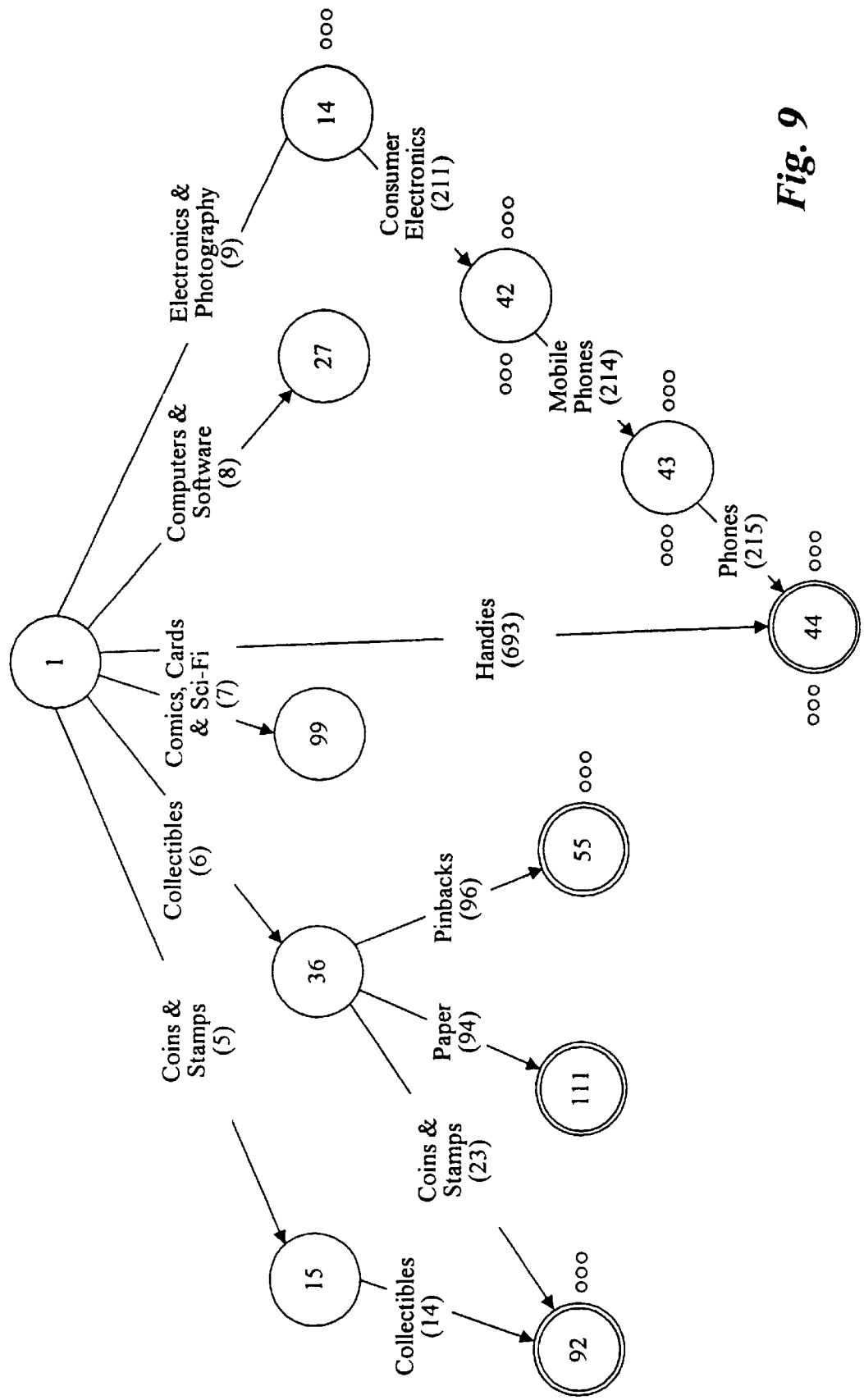
FIG. 9 is a data structure diagram showing a sample alternative browse graph derived from the browse graph shown in FIG. 8.

FIG. 9 is a data structure diagram showing a sample alternative browse graph derived from the browse graph shown in FIG. 8. The browse graph shown in FIG. 9 has been derived from the browse graph shown in FIG. 8 using the steps shown in FIG. 7. In comparing FIG. 9 to FIG. 8, it can be seen that the two browse graphs shown therein are mostly comprised of the same nodes and relations. It can be seen, however, that "PEZ" relation 95 occurring in the first browse graph shown in FIG. 8 is omitted from the second browse graph shown in FIG. 9, thereby preventing access to the browse data associated with node 76 by those users using the second browse graph. The second browse graph further differs from the first browse graph in that it contains "HANDIES" relation 693 from the root node to leaf node 44. This relation has been added to make the browse information associated with the node 44 more readily available to users of the second browse graph.

While the first and second browse graphs are shown conceptually in FIGS. 8 and 9, browse graphs are preferably stored in table form. FIG. 10 is a data structure diagram showing a sample relation table representing only the first browse graph. The relation table 1000 is comprised of rows 1011–1023, each corresponding to one relation in the first browse graph. Each row contains five fields: a graph identifier field 1001, a relation identifier field 1002, relation name field 1003, parent node identifier 1004, and a child node identifier 1005. Because relation table 1000 contains only relations in the first browse graph, the graph identifier field in every row contains the same graph identifier. The relations identifier field contains a unique identifier for each relation in the graph. For example, the relation identifier field of row 1019 contains the relation identifier "95" for the "PEZ" relation shown in FIG. 8. Relation name field contains the name of the relation for each row, which preferably corresponds to the text displayed by the facility to the user for selecting a further category. The parent node identifier field contains the unique identifier of the node that is the parent node for the relation described by the row. For example, row 1019 indicates that the parent node of the "PEZ" relation 95 has a node identifier "36." Similarly, the child node identifier field indicates the node identifier for the node that is the child node of the relation that the row describes. For example, row 1019 indicates that the child node of the Pez relation 95 has node identifier "76."

In order to identify for a particular current node the categories that are available for selection, the facility preferably searches the relation table for relations having the node identifier of the current node in their parent node identifier fields. If the result set of such rows is nonempty, then the facility preferably displays the relation names of those relations as categories for the user to choose. If, on the other hand, the result set is empty, then the current node is a leaf node, and the facility preferably displays the browse data associated with the leaf node.

FIG. 11 is a data structure diagram showing a sample relation table representing both the first and the second browse graphs. In accordance with the steps shown in FIG. 7, the facility has copied the contents of rows 1011–1023 and to relation table 1100 as new rows 1124–1136. The facility then changes the graph identifier field for the new rows to contain the new graph identifier 2 identifying the new browse graph. The facility further deleted the copy of row 1019 for the "PEZ" relation 95 among the new rows, and added row 1136 for the new "HANDIES" relation 693. It will be understood by those skilled in the art that the above-described facility could be adapted or extended in various ways. For example, browse graphs may be provided on bodies of data of virtually any type. While the foregoing description makes reference to preferred embodiments, the scope of the invention is defined solely by the claims that follow and the elements recited therein.

What is claimed is:

1. A method in a computer system for navigating within a body of data, comprising:
   receiving a navigation request from a first user;
   based on a characteristic of the first user, determining that the first user is in a first group of users, wherein the first group of users is defined according to buying preferences;
   based on determining that the first user is in a first group of users, browsing the body of data in response to input from the first user using a first browse graph;
   receiving a navigation request from a second user;
   based on a characteristic of the second user, determining that the second user is in a second group of users, wherein the second group of users is defined according to buying preferences, and wherein the second group of users is distinct from the first group of users; and
   based on determining that the second user is in a second group of users, browsing the body of data in response to input from the second user using a second browse graph distinct from the first browse graph.

2. The method of claim 1 wherein the body of data browsed using the first and second browse graphs is a listing of items for sale.

3. The method of claim 1 wherein the first browse graph is tailored to the preferences of the first group of users and the second browse graph is tailored to the preferences of the second group of users.

4. The method of claim 1 wherein the second browse graph is constructed so as to prevent access to a portion of the body of data that is prohibited with respect to members of the second group of users.

5. The method of claim 1 wherein browsing the body of data in response to input from the first user using a first browse graph involves traversing a first path of relations in the first browse graph to access a selected subset of the body of data,
   and wherein browsing the body of data in response to input from the second user using a second browse graph involves traversing a second path of relations in the second browse graph to access the selected subset of the body of data, the first and second paths to the selected subset of the body of data being different.

6. The method of claim 1 wherein browsing the body of data in response to input from the first user using a first browse graph involves traversing a first path of relations in the first browse graph to access a selected subset of the body of data, and wherein the first path of relations is not available in the second browse graph, so that the selected subset of the body of data cannot be accessed by the second user.

7. The method of claim 1 wherein both the first and second browse graphs are composed of browse relations, and wherein the second graph includes a browse relation not included in the first browse graph.

8. The method of claim 1 wherein the first browse graph is comprised of a plurality of text segments in a first natural language, and wherein the second browse graph is comprised of the plurality of text segments in a second natural language distinct from the first natural language.

9. A computer-readable medium whose contents cause a computer system to navigate within a body of data by:
   receiving a navigation request of a first type, wherein the navigation request includes an indication of buying preferences for a first user;
   in response to receiving the navigation request of the first type, browsing the body of data using a first browse graph, wherein the first browse graph is tailored to users issuing navigation requests of the first type;
   receiving a navigation request of a second type, wherein the navigation request includes an indication of buying preferences for a second user, wherein the buying preferences for the second user are distinct from the buying preferences for the first user; and
   in response to receiving the navigation request of the second type, browsing the body of data using a second browse graph distinct from the first browse graph, wherein the second browse graph is tailored to users issuing navigation requests of the second type.

10. The computer-readable medium of claim 9 wherein the second browse graph is constructed so as to prevent access to a subset of the body of data that is prohibited with respect to users issuing navigation requests of the second type.

11. The computer-readable medium of claim 9 wherein browsing the body of data using a first browse graph involves traversing a first path of relations in the first browse graph to access a selected subset of the body of data, and wherein browsing the body of data using a second browse graph involves traversing a second path of relations in the second browse graph to access the selected subset of the body of data, the first and second paths to the selected subset of the body of data being different.

12. The computer-readable medium of claim 9 wherein browsing the body of data using a first browse graph involves traversing a first path of relations in the first browse graph to access a selected subset of the body of data, and wherein the first path of relations is not available in the second browse graph, so that the selected subset of the body of data cannot be accessed by users issuing navigation requests of the second type.

13. The computer-readable medium of claim 9 wherein both the first browse graph and second browse graph are composed of browse relations, and wherein the second browse graph includes a browse relation not included in the first browse relation.

14. The computer-readable medium of claim 9 wherein the first browse graph is comprised of a plurality of text segments in a first natural language, and wherein the second graph is comprised of the plurality of text segments in a second natural language distinct from the first natural language.

15. A method in a computer system for navigating within a body of data using one of a plurality of distinct browse graphs, comprising:

receiving a navigation request containing information, wherein the information includes an indication of a characteristic for a user;

based upon the received indication of a characteristic for a user, selecting one of the plurality of browse graphs, wherein the plurality of browse graphs include a first browse graph and a second browse graph; and in response to user input received subsequent to the receipt of the navigation request, browsing the body of data using the selected browse graph, wherein the body of data contains a selected portion, and wherein the user input sequence required to browse to the selected portion using the first browse graph is different than the user input sequence required to browse to the selected portion using the second browse graph.

16. A method in a computer system for navigating within a body of data using one of a plurality of distinct browse graphs, comprising:

receiving a navigation request containing information, wherein the information includes an indication of a characteristic for a user;

based upon the received indication of a characteristic for a user, selecting one of the plurality of browse graphs, wherein the plurality of browse graphs include a first browse graph and a second browse graph; and in response to user input received subsequent to the receipt of the navigation request, browsing the body of data using the selected browse graph, wherein the body of data contains a selected portion, and wherein the first browse graph can be used to browse to the selected portion and the second browse graph cannot be used to browse to the selected portion.

17. A method in a computer system for navigating within a body of data using one of a plurality of distinct browse graphs, comprising:

receiving a navigation request containing information, wherein the information includes an indication of a characteristic for a user;

based upon the received indication of a characteristic for a user, selecting one of the plurality of browse graphs, wherein the plurality of browse graphs include a first browse graph and a second browse graph, and wherein the first browse graph is comprised of a plurality of text segments in a first natural language, and wherein the second browse graph is comprised of the plurality of text segments in a second natural language distinct from the first natural language; and in response to user input received subsequent to the receipt of the navigation request, browsing the body of data using the selected browse graph.

18. A computer-readable medium whose contents cause a computer system to navigate within a body of data using one of a plurality of distinct browse graphs by:

receiving a navigation request containing information, wherein the information includes an indication of a characteristic for a user;

based upon the received indication of the characteristic for a user, selecting one of the plurality of browse graphs, wherein the plurality of browse graphs include a first browse graph and a second browse graph, and in response to user input, browsing the body of data using the selected browse graph, wherein the body of data contains a selected portion, and wherein the user input sequence required to browse to the selected portion using the first browse graph is different than the user input sequence required to browse to the selected portion using the second browse graph.

19. A computer-readable medium whose contents cause a computer system to navigate within a body of data using one of a plurality of distinct browse graphs by:

receiving a navigation request containing information, wherein the information includes an indication of a characteristic for a user;

based upon the received indication of the characteristic for a user, selecting one of the plurality of browse graphs, wherein the plurality of distinct browse graphs include a first browse graph and a second browse graph; and in response to user input, browsing the body of data using the selected browse graph, wherein the body of data contains a selected portion, and wherein the first browse graph can be used to browse to the selected portion and the second browse graph cannot be used to browse to the selected portion.

20. A computer-readable medium whose contents cause a computer system to navigate within a body of data using one of a plurality of distinct browse graphs by:

receiving a navigation request containing information, wherein the information includes an indication of a characteristic for a user;

based upon the received indication of the characteristic for a user, selecting one of the plurality of browse graphs, wherein the plurality of distinct browse graphs include a first browse graph and a second browse graph, and wherein the first browse graph is comprised of a plurality of text segments in a first natural language, and wherein the second browse graph is comprised of the plurality of text segments in a second natural language distinct from the first natural language; and in response to user input, browsing the body of data using the selected browse graph.

21. A method in a computer system for browsing data, the method comprising:

while browsing the data in a first browse mode tailored to users with a first set of buying preferences, receiving a first set of navigation commands;

in response to receiving the first set of navigation commands in the first browse mode, browsing to an identified portion of the data;

receiving a command to store an item in the browsed-to identified portion of data;

in response to receiving a command to store an identified item in the browsed-to identified portion of data, storing the identified item in the browsed-to identified portion of data;

while browsing the data in a second browse mode tailored to users with a second set of buying preferences distinct from the first set of buying preferences, receiving a second set of navigation commands distinct from the first set of navigation commands;

in response to receiving the second set of navigation commands in the second browse mode, browsing to the identified portion of the data; and displaying the identified portion of the data, including the stored identified item.

22. The method of claim 21 wherein the storing stores a selected indication of an item for sale, and wherein the displaying displays indications of items for sale, including the selected indication.

23. A computer memory containing a compound browsing data structure comprising:

a plurality of browse graphs, each browse graph comprising a plurality of relations used to access a body of subject data, such that the subject data may be accessed using any one of the plurality of browse graphs, wherein each browse graph is tailored to users with a distinct set of buying preferences and wherein each browse graph specifies a location in the browse graph for each of the plurality of data portions; and a plurality of data portions collectively constituting the subject data.

24. A computer memory containing a compound browsing data structure comprising:

a plurality of browse graphs, each browse graph comprising a plurality of relations used to access a body of subject data, such that the subject data may be accessed using any one of the plurality of browse graphs, wherein each browse graph is tailored to users with a distinct set of buying preferences; and wherein at least two of the browse graphs specify different locations for a selected one of the data portions.

25. The method of claim 1 wherein the characteristic of the first user and the characteristic of the second user is the Internet Service Provider used by the first user and the second user.

26. The method of claim 1 wherein the characteristic of the first user and the characteristic of the second user is the domain name designation associated with the first user and the second user.

27. The computer-readable medium of claim 18 wherein the indication of a characteristic for a user is an implicit indication.

28. The computer-readable medium of claim 18 wherein the indication of a characteristic for a user is an explicit indication.

29. A computer system for browsing a body of data, comprising:

a receiver that receives a navigation request, wherein the navigation request includes an indication of a characteristic for a user;

a browse graph store that contains a plurality of distinct browse graphs; and a data browser that uses one of the plurality of distinct browse graphs selected based upon the received indication of a characteristic for a user to browse the body of data, wherein the characteristic for the user is the buying patterns of the user.

30. A computer system for browsing a body of data, comprising:

a receiver that receives a navigation request, wherein the navigation request includes an indication of a characteristic for a user;

a browse graph store that contains a plurality of distinct browse graphs; and a data browser that uses one of the plurality of distinct browse graphs selected based upon the received indication of a characteristic for a user to browse the body of data, wherein the characteristic for the user is the geographic region of the user.

31. A computer system for browsing a body of data, comprising:

a receiver that receives a navigation request, wherein the navigation request includes an indication of a characteristic for a user;

a browse graph store that contains a plurality of distinct browse graphs; and a data browser that uses one of the plurality of distinct browse graphs selected based upon the received indication of a characteristic for a user to browse the body of data, wherein the characteristic for the user is the political region of the user.

32. A method in a computer system for navigating within a body of data, comprising:

receiving a navigation request from a first user;

based on a characteristic of the first user, determining that the first user is in a first group of users, wherein the first group of users is defined according to geographic region;

based on determining that the first user is in a first group of users, browsing the body of data in response to input from the first user using a first browse graph;

receiving a navigation request from a second user, based on a characteristic of the second user, determining that the second user is in a second group of users, wherein the second group of users is defined according to geographic region, and wherein the second group of users is distinct from the first group of users; and based on determining that the second user is in a second group of users, browsing the body of data in response to input from the second user using a second browse graph distinct from the first browse graph, wherein the second browse graph is constructed so as to prevent access to a portion of the body of data that is prohibited with respect to members of the second group of users.

* * * * *

(12) EX PARTE REEXAMINATION CERTIFICATE (7722nd)
United States Patent
McDade et al.

(10) Number: US 6,625,609 C1
(45) Certificate Issued: Sep. 7, 2010

(54) METHOD AND SYSTEM FOR NAVIGATING WITHIN A BODY OF DATA USING ONE OF A NUMBER OF ALTERNATIVE BROWSE GRAPHS

(75) Inventors: Robert W. McDade, Bellevue, WA (US); Anne K. Krook, Seattle, WA (US); Bonnie Bouman, Seattle, WA (US)

(73) Assignee: A9.com, Inc., Palo Alto, CA (US)

Reexamination Request:
No. 90/008,293, Nov. 14, 2006

Reexamination Certificate for:
Patent No.: 6,625,609
Issued: Sep. 23, 2003
Appl. No.: 09/433,799
Filed: Nov. 3, 1999

(51) Int. Cl.
*G06F 17/30* (2006.01)
*G06F 12/00* (2006.01)

(52) U.S. Cl. .......................... 707/999.102; 707/E17.111
(58) Field of Classification Search .................. 725/115, 725/116, 117
See application file for complete search history.

(56) References Cited

U.S. PATENT DOCUMENTS

| | | | |
|---|---|---|---|
| 5,694,549 A | 12/1997 | Carlin et al. | |
| 5,721,908 A | 2/1998 | Lagarde et al. | |
| 5,754,938 A | * 5/1998 | Herz et al. | .................. 725/116 |
| 5,768,578 A | 6/1998 | Kirk et al. | |
| 5,812,134 A | 9/1998 | Pooser et al. | |
| 5,907,843 A | 5/1999 | Cleron et al. | |
| 5,944,790 A | * 8/1999 | Levy | ........................... 709/218 |
| 5,963,948 A | 10/1999 | Shilcrat | |
| 6,009,459 A | 12/1999 | Belfiore et al. | |
| 6,078,928 A | 6/2000 | Schnase et al. | |
| 6,081,814 A | 6/2000 | Mangat et al. | |
| 6,211,877 B1 | 4/2001 | Steele et al. | |
| 6,324,552 B1 | 11/2001 | Chang et al. | |
| 6,363,383 B1 | 3/2002 | Kindo et al. | |
| 6,457,009 B1 | 9/2002 | Bollay | |
| 6,633,852 B1 | 10/2003 | Keckerman et al. | |
| 7,139,771 B2 | 11/2006 | McDade et al. | |

FOREIGN PATENT DOCUMENTS

| | | |
|---|---|---|
| EP | 0908833 | 4/1999 |
| WO | WO 99/52032 A1 | 10/1999 |

OTHER PUBLICATIONS

Webpages published on the Yahoo! Internet Website, as archived by the Wayback Machine (www.archive.org) dated Jun. 30, 1998.
Webpages published on the Ebay Internet Website dated Oct. 21, 1998.
Webpages published on the Ebay Internet Website as archived by the Wayback Machine (www.archive.org) dated Oct. 12, 1999.

* cited by examiner

*Primary Examiner*—Sam Rimell

(57) ABSTRACT

A facility for navigating within a body of data using one of a number of distinct browse graphs is described. Initially, a navigation request is received. Based upon information contained in the received navigation request, the facility selects one of the plurality of browse graphs. In response to user input the facility browses the body of data using the selected browse graph.

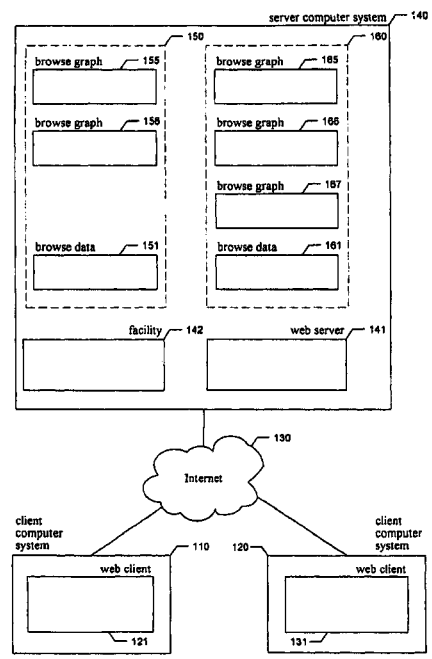

US 6,625,609 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9-15 and 23-28 are cancelled.

Claims 1, 16-21 and 29-32 are determined to be patentable as amended.

Claims 2-8 and 22, dependent on an amended claim, are determined to be patentable.

New claims 33 and 34 are added and determined to be patentable.

1. A method in a computer system for navigating within a body of data, comprising:
specifying a first browse graph for a first group of users and a second browse graph for a second group of users;
receiving a navigation request from a first user;
[based on a characteristic of the first user,] after specifying the first browse graph for the first group of users and the second browse graph for the second group of users, determining that the first user is in [a] the first group of users, [wherein] based at least in part upon a characteristic of the first user, the first group of users [is] being defined according to buying preferences;
based on determining that the first user is in a first group of users, generating for display a first page of information corresponding to the body of data and browsing the body of data in response to input from the first user through the first page, the first page being generated in response to the navigation request from the first user using a first browse graph, the first browse graph including a first set of relations for the body of data;
receiving a navigation request from a second user;
[based on a characteristic of the second user] after specifying the first browse graph for the first group of users and the second browse graph for the second group of users, determining that the second user is in [a] the second group of users based at least in part upon a characteristic of the second user, wherein the second group of users is defined according to buying preferences, and wherein the second group of users is distinct from the first group of users; and
based on determining that the second user is in a second group of users, generating for display a second page of information corresponding to the body of data and browsing the body of data in response to input from the second user through the second page, the second page being generated in response to the navigation request from the second user using a second browse graph, the second browse graph being distinct from the first browse graph and including a second set of relations for the body of data.

16. A method in a computer system for navigating within a body of data using one of a plurality of distinct browse graphs, comprising:
generating one of the plurality of distinct browse graphs for each of a plurality of user characteristics, each browse graph including a different set of relations for navigating the body of data;
receiving a navigation request containing information, wherein the information includes an indication of a characteristic for a user;
[based upon the received indication of a characteristic for a user, selecting one] after generating one of the plurality of distinct browse graphs for each of the plurality of user characteristics, determining which of the plurality of browse graphs to select for the user based at least in part upon the received indication of a characteristic for the user, wherein the plurality of browse graphs include a first browse graph and a second browse graph;
generating for display a page of user-selectable navigation elements each corresponding to a relation in the selected browse graph; and
in response to user input received [subsequent to receipt of the navigation request] corresponding to one of the user-selectable navigation elements, browsing the body of data using the relations of the selected browse graph, wherein the body of data contains a selected portion, and wherein the first browse graph can be used to browse to the selected portion and the second browse graph cannot be used to browse to the selected portion.

17. A method in a computer system for navigating within a body of data using one of a plurality of distinct browse graphs, comprising:
generating one of the plurality of distinct browse graphs for each of a plurality of groups of users, each browse graph including a different set of relations for navigating the body of data;
receiving a navigation request containing information, wherein the information includes an indication of a characteristic for a user;
[based upon the received indication of a characteristic for a user] after generating one of the plurality of distinct browse graphs for each of the plurality of groups of users, determining which of the plurality of groups of users corresponds to the characteristic for the user and selecting one of the plurality of browse graphs corresponding to the determined group of users, wherein the plurality of browse graphs include a first browse graph and a second browse graph, and wherein the first browse graph is comprised of a plurality of text segments in a first natural language, and wherein the second browse graph is comprised of the plurality of text segments in a second natural language distinct from the first natural language;
generating for display a page of user-selectable navigation elements each corresponding to a relation in the selected browse graph; and
in response to user input received [subsequent to receipt of the navigation request] corresponding to one of the user-selectable navigation elements, browsing the body of data using the relations of the selected browse graph.

18. A computer-readable medium whose contents cause a computer system to navigate within a body of data using one of a plurality of distinct browse graphs by:
selecting one of the plurality of distinct browse graphs for each of a plurality of groups of users, each browse graph including *a different set of relations for navigating the body of data;* receiving a navigation request containing information[, wherein the information includes] *including* an indication of a characteristic for a user;

[based upon the received indication of a characteristic for a user,] *after selecting one of the plurality of distinct browse graphs for each of the plurality of groups of users, determining which of the plurality of groups of users corresponds* to the characteristic for the user and selecting one of the plurality of browse graphs *corresponding to the determined group of users*, wherein the plurality of browse graphs include a first browse graph and a second browse graph[.] ;

generating for display a page including a plurality of user-selectable elements each corresponding to a relation in the selected browse graph; and in response to user input *corresponding to one of the user-selectable elements*, browsing the body of data using the *relations of the* selected browse graph, wherein the body of data contains a selected portion, and wherein the user input sequence required to browse to the selected portion using the first browse graph is different than the user input sequence required to browse to the selected portion using the second browse graph.

19. A computer-readable medium whose contents cause a computer system to navigate within a body of data using one of a plurality of distinct browse graphs by:

selecting one of the plurality of distinct browse graphs for each of a plurality of groups of users, each browse graph including *a different set of relations for navigating the body of data;* after selecting one of the plurality of distinct browse graphs for each of the plurality of groups of users, receiving a navigation request containing information, wherein the information includes an indication of a characteristic for a user;

[based upon the received indication of a characteristic for a user,] *determining which of the plurality of groups of users corresponds to the received characteristic for the user and* selecting one of the plurality of browse graphs *corresponding to the determined group of users*, wherein the plurality of distinct browse graphs include a first browse graph and a second browse graph;

generating for display a page including a plurality of navigation elements each corresponding to a relation in the selected browse graph; and in response to user input *corresponding to one of the navigation elements*, browsing the body of data using the *relations of the* selected browse graph, wherein the body of data contains a selected portion, and wherein the first browse graph can be used to browse to the selected portion and the second browse graph cannot be used to browse to the selected portion.

20. A computer-readable medium whose contents cause a computer system to navigate within a body of data using one of a plurality of distinct browse graphs by:

selecting one of the plurality of distinct browse graphs for each of a plurality of groups of users, each browse graph including *a different set of relations for navigating the body of data;* after selecting one of the plurality of distinct browse graphs for each of the plurality of groups of users, receiving a navigation request containing information, wherein the information includes an indication of a characteristic for a user;

based *at least in part* upon the received indication of the characteristic for a user, *determining which of the plurality of groups of users corresponds to the characteristic for the user and* selecting one of the plurality of browse graphs *corresponding to the determined group of users*, wherein the plurality of distinct browse graphs include a first browse graph and a second browse graph, and wherein the first browse graph is comprised of a plurality of text segments in a first natural language, and wherein the second browse graph is comprised of the plurality of text segments in a second natural language distinct from the first natural language;

generating for display a page including a plurality of navigation elements each corresponding to a relation in the selected browse graph *and having the respective one of the first and second natural languages;* and in response to user input *corresponding to one of the plurality of navigation elements*, browsing the body of data using the *relations of the* selected browse graph.

21. A method in a computer system for browsing data, the method comprising:

*selecting a first browse mode for a first group of users and a second browse mode for a second group of users, each browse mode including a different set of relations for navigating a body of data;*

*upon receiving a request to browse the body of data, and after selecting the first browse mode for the first group of users and the second browse mode for the second group of users, determining which browse mode to utilize based at least in part upon a characteristic of a user corresponding to the request;* while browsing the data in a first browse mode tailored to [users with a first set of buying preferences,] *the first group of users, receiving from a first user of a first page* a first set of navigation commands *each corresponding to a stored relation of the data for the first browse mode*;

in response to receiving the first set of navigation commands in the first browse mode, browsing to an identified portion of the data *using relations of the first browse mode*;

receiving a command to store an item in the browsed-to identified portion of data;

in response to receiving a command to store an identified item in the browsed-to identified portion of data, storing the identified item in the browsed-to identified portion of data;

while browsing the data in a second browse mode tailored to [users with a second set of buying preferences distinct from the first set of buying preferences,] *the second group of users, receiving from a second user of a second page* a second set of navigation commands distinct from the first set of navigation commands, *each of the second set of navigation commands corresponding to a stored relation of the data for the second browse mode*;

in response to receiving the second set of navigation commands in the second browse mode, browsing to the identified portion of the data *using relations of the second browse mode*; and

[displaying] *generating for display* the identified portion of the data, including the stored identified item.

29. A computer system for browsing a body of data, comprising:

a receiver that receives a nagivation request, wherein the navigation request includes an indication of a characteristic for a user;

a browse graph store that contains a plurality of distinct browse graphs, *each browse graph including a set of relations for the body of data, each of the distinct browse graphs being selected for a group of users having at least one common characteristic*;

a browse graph determination component that, *after a navigation request is received for a user and each of the distinct browse graphs has been selected for a group of users, determines the group of users to which the user belongs and the browse graph corresponding to that group of users;* and a data browser that uses [one of the plurality of distinct browse graphs selected based upon the received indication of a characteristic for a user] *the determined browse graph* to browse the body of data *according to the set of relations of the determined browse graph by generating for display a page including a plurality of user-selectable navigation elements each corresponding to a relation of the determined browse graph and receiving user input in response thereto*, wherein the characteristic for the user is the buying patterns of the user.

30. A computer system for browsing a body of data, comprising:

a receiver that receives a navigation request, wherein the navigation request includes an indication of a characteristic for a user;

a browse graph store that contains a plurality of distinct browse graphs, *each browse graph including a set of relations for the body of data, each of the distinct browse graphs being selected for a group of users having at least one common characteristic*;

a browse graph determination component that, *after a navigation request is received for a user and each of the distinct browse graphs has been selected for a group of users, determines the group of users to which the user belongs and the browse graph corresponding to that group of users;* and a data browser that uses [one of the plurality of distinct browse graphs selected based upon the received indication of a characteristic for a user] *the determined browse graph* to browse the body of data *according to the set of relations of the determined browse graph by generating for display a page including a plurality of user-selectable navigation elements each corresponding to a relation of the determined browse graph and receiving user input in response thereto*, wherein the characteristic for the user is the geographic region of the user.

31. A computer system for browsing a body of data, comprising:

a receiver that receives a navigation request, wherein the navigation request includes an indication of a characteristic for a user;

a browse graph store that contains a plurality of distinct browse graphs, *each browse graph including a set of relations for the body of data, each of the distinct browse graphs being selected for a group of users having at least one common characteristic*;

a browse graph determination component that, *after a navigation request is received for a user and each of the distinct browse graphs has been selected for a group of users, determines the group of users to which the user belongs and the browse graph corresponding to that group of users;* and a data browser that uses [one of the plurality of distinct browse graphs selected based upon the received indication of a characteristic for a user] *the determined browse graph* to browse the body of data *according to the set of relations of the determined browse graph by generating for display a page including a plurality of user-selectable navigation elements each corresponding to a relation of the determined browse graph and receiving user input in response thereto*, wherein the characteristic for the user is the political region of the user.

32. A method in a computer system for navigating within a body of data, comprising:

*selecting one of a plurality of distinct browse graphs for each of a plurality of groups of users, each browse graph including a different set of relations for navigating within the body of data;* receiving a navigation request from a first user;

*after selecting one of the plurality of distinct browse graphs for each of the plurality of groups of users, and* based *at least in part* on a characteristic of the first user, determining that the first user is in a first group of users, wherein the first group of users is defined according to geographic region;

based on determining that the first user is in a first group of users, *generating for display a first page including a plurality of user-selectable navigation elements for* browsing the body of data [in response to input from the first user using a first browse graph] *according to stored relations of a first browse graph for the body of data*;

receiving a navigation request from a second user,

*after selecting one of the plurality of distinct browse graphs for each of the plurality of groups of users, and* based *at least in part* on a characteristic of the second user, determining that the second user is in a second group of users, wherein the second group of users is defined according to geographic region, and wherein the second group of users is distinct from the first group of users; and based on determining that the second user is in a second group of users, *generating for display a second page including a plurality of user-selectable navigation elements for* browsing the body of data [in response to input from the second user using a second browse graph] *according to stored relations of a second browse graph for the body of data* distinct from the first browse graph, wherein the *relations of the* second browse graph [is constructed] *are determined* so as to prevent access to a portion of the body of data that is prohibited with respect to members of the second group of users.

*33. A computer-implemented method for navigating within a body of data, comprising:*

*under control of one or more computer systems configured with executable instructions,*

*defining a first group of users and a second group of users according to buying preferences, wherein the second group of users is distinct from the first group of users;*

*specifying a first browse graph for the first group of users and a second browse graph for the second group of users, each of the first and second browse graphs including a different set of relations for navigating a body of data, each different set of relations based at least in part upon the buying preferences of the respective first and second group of users;*

*receiving a navigation request from a user;*

*after specifying the first browse graph for the first group of users and a second browse graph for the second group* of users, determining whether the user is in the first group of users or the second group of users based at least in part on a characteristic of the user; and generating for display a page of information corresponding to the body of data and browsing the body of data in response to input from the user through the page, the page being generated in response to the navigation request from the user using one of the first and second browse graphs based upon whether the user is determined to be in the first group of users or the second group of users.

34. A computer-implemented method for navigating within a body of data, comprising:

under control of one or more computer systems configured with executable instructions, defining a plurality of groups of users based at least in part upon buying preferences;

specifying a browse graph for each group of users, each browse graph including a different set of relations for navigating a body of data, each different set of relations based at least in part upon the buying preferences of the respective group of user;

receiving a navigation request from a user;

after specifying the browse graph for each group of users, determining that the user is in one of the plurality of groups of users based at least in part on a characteristic of the user; and generating for display a page of information corresponding to the body of data and browsing the body of data in response to input from the user through the page, the page being generated in response to the navigation request from the user using one of the plurality of browse graphs based upon at least the determined group of users for the first user.

\* \* \* \* \*